US007948437B2

(12) United States Patent
Torimoto et al.

(10) Patent No.: US 7,948,437 B2
(45) Date of Patent: May 24, 2011

(54) POSITIONAL INFORMATION PROVIDING SYSTEM, POSITIONAL INFORMATION PROVIDING APPARATUS AND TRANSMITTER

(75) Inventors: Hideyuki Torimoto, Tokyo (JP); Makoto Ishii, Tokyo (JP); Masahiro Asako, Tokyo (JP); Satoshi Kogure, Tsukuba (JP)

(73) Assignee: GNSS Technologies Inc., Tokyo (JP)

( * ) Notice: Subject to any disclaimer, the term of this patent is extended or adjusted under 35 U.S.C. 154(b) by 258 days.

(21) Appl. No.: 12/296,013

(22) PCT Filed: Apr. 2, 2007

(86) PCT No.: PCT/JP2007/057384
§ 371 (c)(1),
(2), (4) Date: Oct. 3, 2008

(87) PCT Pub. No.: WO2007/119645
PCT Pub. Date: Oct. 25, 2007

(65) Prior Publication Data
US 2009/0115661 A1    May 7, 2009

(30) Foreign Application Priority Data

Apr. 4, 2006 (JP) .................................. 2006-103213

(51) Int. Cl.
*G01S 1/08* (2006.01)
*G01S 19/48* (2010.01)
(52) U.S. Cl. .................................. 342/386; 342/357.31
(58) Field of Classification Search ............. 342/357.01, 342/357.09, 357.12, 357.13, 386, 387, 357.29, 342/357.31; 701/213, 215
See application file for complete search history.

(56) References Cited

U.S. PATENT DOCUMENTS

| 5,373,531 | A | 12/1994 | Kawasaki et al. |
| 5,708,440 | A | 1/1998 | Trimble et al. |
| 6,556,942 | B1 * | 4/2003 | Smith ........................ 702/150 |
| 6,564,064 | B1 | 5/2003 | Ciganer et al. |
| 6,795,019 | B2 * | 9/2004 | Holt ............................ 342/453 |
| 7,023,382 | B1 | 4/2006 | Akano |
| 2005/0080563 | A1 | 4/2005 | Petrovski et al. |
| 2005/0083232 | A1 | 4/2005 | Trautenberg |

FOREIGN PATENT DOCUMENTS

JP    4-96530 A    3/1992
(Continued)

OTHER PUBLICATIONS

Notice of Grounds of Rejection cited in Appeal No. 12236/2008 (Patent Application No. 103213/2006), mailed on Jan. 26, 2009, with translation, 4 pages.

(Continued)

*Primary Examiner* — Dao L Phan
(74) *Attorney, Agent, or Firm* — Osha • Liang LLP

(57) ABSTRACT

Positional information is provided at a place out of reach of radio wave. The process executed by a positional information providing apparatus includes the steps of: obtaining a received positioning signal; specifying an emission source of the positioning signal; obtaining, when the emission source of the positioning signal is outdoors, a navigation message included in the positioning signal; executing a process for calculating the position based on the signal; obtaining, when the emission source of the positioning signal is indoors, message data from the positioning signal; obtaining coordinate values from the data; and displaying positional information based on the coordinate values.

20 Claims, 15 Drawing Sheets

FOREIGN PATENT DOCUMENTS

| | | |
|---|---|---|
| JP | 2003-57330 A | 2/1993 |
| JP | 5-316021 A | 11/1993 |
| JP | 6-59013 A | 3/1994 |
| JP | 11-14732 A | 1/1999 |
| JP | 2001-201556 A | 7/2001 |
| JP | 2002-517731 A | 6/2002 |
| JP | 2002-277279 A | 9/2002 |
| JP | 2004-502175 A | 1/2004 |
| JP | 2004-198434 A | 7/2004 |
| JP | 2005-43193 A | 2/2005 |
| JP | 2005-83888 A | 3/2005 |
| JP | 2005-530985 A | 10/2005 |
| JP | 2006-67086 A | 3/2006 |
| TW | 487806 | 5/2002 |

OTHER PUBLICATIONS

"IS-GPS-200 Revision D IRN-200D-001," (Space and Missile Systems Center (SMC), Navstar GPS Joint Program Office (SMC/GP), Mar. 7, 2006, USA, 221 pages.
"IS-GPS-200 Revision D," (Space and Missile Systems Center (SMC), Navstar GPS Joint Program Office (SMC/GP), Dec. 7, 2004, USA, 207 pages.
Patent Abstracts of Japan, Publication No. 11-14732, dated Jan. 22, 1999, 1 page.
Abstract of WO03079044, which corresponds to JP2005-530985 cited above, 2 pages, published on Oct. 13, 2005.
Abstract of JP4-096530, published on Mar. 27, 1992, 2 pages.
Abstract of JP6-059013, published on Mar. 4, 1994, 2 pages.
Abstract of JP2002-277279, published on Sep. 25, 2002, 2 pages.
Abstract of JP5-316021, published on Nov. 26, 1993, 2 pages.
Abstract of JP2005-083888, published on Mar. 31, 2005, 2 pages.
Abstract of JP2005-043193, published on Feb. 17, 2005, 2 pages.
Abstract of JP2006-067086, published on Mar. 9, 2006, 2 pages.
Abstract of JP2003-057330, published on Feb. 26, 2003, 2 pages.
Abstract of WO9963358, which corresponds to JP2002-517731 cited above, 2 pages, published on Jun. 18, 2002.
Abstract of JP2001-201556, published on Jul. 27, 2001, 2 pages.
Abstract of JP2004-198434, published on Jul. 15, 2004, 2 pages.
Abstract of WO0201243, which corresponds to JP2004-502175 cited above, published on Jan. 22, 2004, 2 pages.
Office Action issued in parent application JP 103213/2006, mailed on Oct. 2, 2007, with translation, 8 pages.
Office Action issued in parent application JP 103213/2006, mailed on Apr. 15, 2008, with translation, 5 pages.
Office Action issued in parent application JP 103213/2006, mailed on Jan. 15, 2008, with translation, 7 pages.
International Search Report issued in PCT/JP2007/057384, mailed on May 15, 2007, w/translation, 4 pages.
Taiwanese Office action for patent application No. 096112145 issued on Dec. 7, 2009, 5 pages.
English Abstract from esp@cenet forTaiwanese patent No. 487806, Publication date: May 21, 2002, 1 page.
Vlad Badea, Rikard Eriksson: "Indoor Navigation with Pseudolites (fake GPS sat.)", Jan. 27, 2005, pp. 19-34; figures 18,20,22,27,28,42, Linkoepings University, Norrkoeping, Sweden.
Extended Search Report from the European Patent Office, Dated May 17, 2010, for related patent application No. 07740820.1, 8 pages.

* cited by examiner

FIG.15

| RECORD NO. 1520 | TRANSMITTER ID 1520 | INSTALLATION COORDINATES 1530 | INSTALLATION SITE NAME 1540 | ADDRESS 1550 |
|---|---|---|---|---|
| 001 | 01 | LATITUDE 35 DEGREE 41 MINUTE 687 SECOND NORTH LONGITUDE 139 DEGREE 42 MINUTE 482 SECOND EAST ALTITUDE 100 m | GT COMPANY | SHINJUKU, TOKYO··· |
| 002 | 02 | ... | ... | ... |
| 003 | 03 | ... | ... | ... |
| ... | ... | ... | ... | ... |

1450

POSITIONAL INFORMATION PROVIDING SYSTEM, POSITIONAL INFORMATION PROVIDING APPARATUS AND TRANSMITTER

TECHNICAL FIELD

The present invention relates to a technique for providing positional information. More specifically, the present invention relates to a technique for providing positional information even in an environment out of reach of a signal transmitted from a satellite emitting a positioning signal.

BACKGROUND ART

GPS (Global Positioning System) has been known as a conventional positioning system. A satellite (hereinafter referred to as a "GPS satellite") transmitting a signal used for GPS (hereinafter referred to as a "GPS signal") flies at an altitude of about 20,000 km from the ground. By receiving and demodulating a signal emitted from the GPS satellite, a user can measure the distance between the GPS satellite and the user. Therefore, if there is no obstacle between the ground and the GPS satellite, positioning is possible using the signal emitted from the GPS satellite. Assume, however, use of the UPS in an urban area. It may often be the case that the signal emitted from the GPS satellite cannot be received by a positional information providing apparatus of the user, hindered by high buildings standing in large numbers. Further, diffraction or reflection of the signal by a building may cause an error in the distance measurement using the signal and, as a result, positioning accuracy is often degraded.

Though a technique has been known to receive in a room a weak GPS signal that has passed through a wall or roof, state of reception is unstable and positioning accuracy is low.

In the foregoing, positioning using GPS has been described by way of example. The phenomenon described above, however, is common to positioning systems using satellites in general. The satellite positioning system is not limited to GPS, and it may include systems such as GLONASS (GLObal Navigation Satellite System) of Russian Federation and Galileo of Europe.

Technique related to provision of positional information is disclosed, for example, in Japanese Patent Laying-Open No. 2006-67086 (Patent Document 1).

Patent Document 1: Japanese Patent Laying-Open No. 2006-67086

DISCLOSURE OF THE INVENTION

Problems to be Solved by the Invention

According to the technique disclosed in Japanese Patent Laying-Open No. 2006-67086, however, the reader or writer is unique to the system for providing positional information and lacks versatility. In order to prevent interference, it is necessary to restrain transmission output and, therefore, the area in which positional information is receivable is limited and it is difficult to obtain positional information continuously. Further, a large number of transmitters are required to cover a wide area.

Further, in connection with acquisition or notification of positional information, it is possible to locate a source of a signal transmission if a telephone call is made from a fixed telephone, as the location of the fixed telephone is known in advance. Wide-spread use of portable telephones, however, makes mobile communication more and more common and it becomes increasingly difficult to notify the positional information of the caller, unlike in the case of a fixed telephone. On the other hand, concerning emergency call, legislation has been considered to include positional information in a call from a portable telephone.

A conventional portable telephone having a positioning function obtains positional information where a signal from a satellite is receivable and, therefore, it is possible to notify the position of the portable telephone. Where it is impossible to receive radio wave, such as in an underground mall or indoors, however, positional information cannot be obtained by the conventional positioning technique.

In view of the foregoing, a technique may be considered in which a plurality of transmitters capable of emitting signals similar to the GPS signal are arranged indoors to find the position based on the principle of trilateration similar to GPS. Such an approach, however, requires that the transmitters are synchronized in time, increasing the cost of transmitters.

Further, indoor reflection and the like makes radio wave propagation complicated, readily resulting in errors of about 10 m.

The present invention was made to solve the above-described problem and its object is to provide a positional information providing system providing positional information without sacrificing accuracy, even at a place out of reach of a radio wave from a satellite emitting a positioning signal.

Another object is to provide a positional information providing system providing positional information based on a signal that does not require synchronization in time with a satellite emitting a positioning signal.

A further object is to provide an information providing apparatus that can provide positional information without sacrificing accuracy even at a place out of reach of a radio wave from a satellite emitting a positioning signal.

A still further object is to provide an information providing apparatus that can provide positional information based on a signal that does not require synchronization in time with a satellite emitting a positioning signal.

A still further object is to provide a transmitter that can transmit a signal providing positional information without sacrificing accuracy even at a place out of reach of a radio wave from a satellite emitting a positioning signal.

A still further object is to provide a transmitter that can transmit a signal providing positional information based on a signal that does not require synchronization in time with a satellite emitting a positioning signal.

Means for Solving the Problems

In order to solve the above-described problems, according to an aspect, the present invention provides a positional information providing system for providing positional information. The system includes a transmitter. The transmitter includes a storage unit storing positional data for specifying a location where the transmitter is installed, a generating unit generating a first positioning signal having the positional data as a spread spectrum signal, and a transmitting unit transmitting the spread spectrum signal. The positional information providing system further includes a positional information providing apparatus. The positional information providing apparatus includes a receiving unit receiving the spread spectrum signal, a storage unit storing a code pattern related to the first positioning signal, a specifying unit specifying, based on the code pattern stored in the storage unit, a code pattern that corresponds to the spread spectrum signal received by the receiving unit, a determining unit determining whether the first positioning signal has been received or not based on a signal demodulated by using the code pattern specified by the specifying unit, an obtaining unit obtaining the positional data from the demodulated signal when the first positioning signal has been received, and an output unit outputting the positional data obtained by the obtaining unit.

Preferably, the first positioning signal has the same format as that of a second positioning signal emitted by a satellite transmitting a signal for positioning, and includes the positional data in place of a navigation message included in the second positioning signal. The positional information providing apparatus further stores, in the storage unit, a code pattern of each of the second positioning signals. The positioning information storage apparatus further includes a calculating unit calculating a position of the positional information providing apparatus based on each navigation message when a plurality of second positioning signals are received.

Preferably, the coded positional signal has central frequency of 1574.42 MHz Spreading frequency of the positioning signal is 1.023 MHz.

According to another aspect, the present invention provides a positional information providing apparatus for providing positional information. The apparatus includes a receiving unit receiving a spread spectrum signal, and a storage unit storing a code pattern related to a first positioning signal. The first positioning signal is emitted from a transmitter installed at a location specified in advance and includes positional data for specifying the location. The apparatus includes a specifying unit for specifying, based on a code pattern stored in the storage unit, a code pattern corresponding to the spread spectrum signal received by the receiving unit, a determining unit determining, based on a signal demodulated by using the code pattern specified by the specifying unit, whether the first positioning signal has been received, an obtaining unit obtaining, when the first positioning signal has been received, the positional data from the demodulated signal, and an output unit outputting the positional data obtained by the obtaining unit.

Preferably, the first positioning signal has the same format as that of a second positioning signal emitted by a satellite transmitting a signal for positioning, and includes the positional data in place of a navigation message included in the second positioning signal. The positional information providing apparatus further stores, in the storage unit, a code pattern of each of the second positioning signals emitted from a plurality of satellites. The code pattern is different satellite by satellite. The positional information providing apparatus further includes a calculating unit calculating a position of the positional information providing apparatus based on each navigation message when a plurality of second positioning signals are received.

Preferably, the receiving unit receives each of the first positioning signals emitted from transmitters installed at a plurality of locations specified in advance. The positional information providing apparatus further includes a detecting unit detecting intensity of a signal received by the receiving unit. The obtaining unit specifies, among the first positioning signals, a first positioning signal of which intensity is the highest, and obtains positional data included in the specified first positioning signal.

Preferably, the positional data includes information representing a location where the transmitter is installed. The output unit includes a display unit displaying the location where the transmitter is installed based on the information.

Preferably, the positional data includes an identification data for identifying the transmitter. The apparatus includes a transmitting unit transmitting, when the first positioning signal is received, the identification data and a transmission request for positional information of the transmitter through a communication line, to a server that provides positional information in response to an external request. The positional information and the identification data are stored in relation to each other in the server. The apparatus further includes an input unit receiving an input of the positional information transmitted by the server in response to the transmission request through the communication line. The output unit includes a display unit for displaying the positional information.

Preferably, the positional information providing apparatus includes any of a portable telephone, a portable information terminal, a portable positioning apparatus, and a positioning system installed in a vehicle.

Preferably, the transmitter is connected to a clock device outputting time information. The positioning signal output from the transmitter includes time data representing time synchronized with time of the clock device. The positional information providing apparatus further includes a clock unit keeping time and outputting time information, and a calibrating unit calibrating time of the clock unit based on the time data included in the positioning signal received by the receiving unit.

Preferably, the positional information providing apparatus further includes a storage unit storing attribute data representing attribute of the positional information providing apparatus, a requesting unit transmitting a request for distributing information in accordance with the attribute data, to an information providing apparatus capable of transmitting information in accordance with the attribute data based on a request, and an input unit receiving an input of the information transmitted by the information providing apparatus based on the distribution request, The output unit includes a display unit for displaying the information.

According to a still further aspect, the transmitter includes a storage unit storing positional data for specifying a location where the transmitter is installed, a generating unit generating a signal having the positional data as a spread spectrum signal, and a transmitting unit transmitting the spread spectrum signal.

Preferably, the generating unit generates a signal of the same format as that of a positioning signal emitted by a satellite transmitting a signal for positioning as a spread spectrum signal.

Effects of the Invention

The positional information providing system according to the present invention is able to provide positional information using a signal not synchronized in time with the satellite.

BRIEF DESCRIPTION OF THE DRAWINGS

FIG. 15 is a conceptual diagram showing a manner of data storage in a hard disk 1450 in information providing server 1230.

DESCRIPTION OF THE REFERENCE SIGNS

Figure 1:
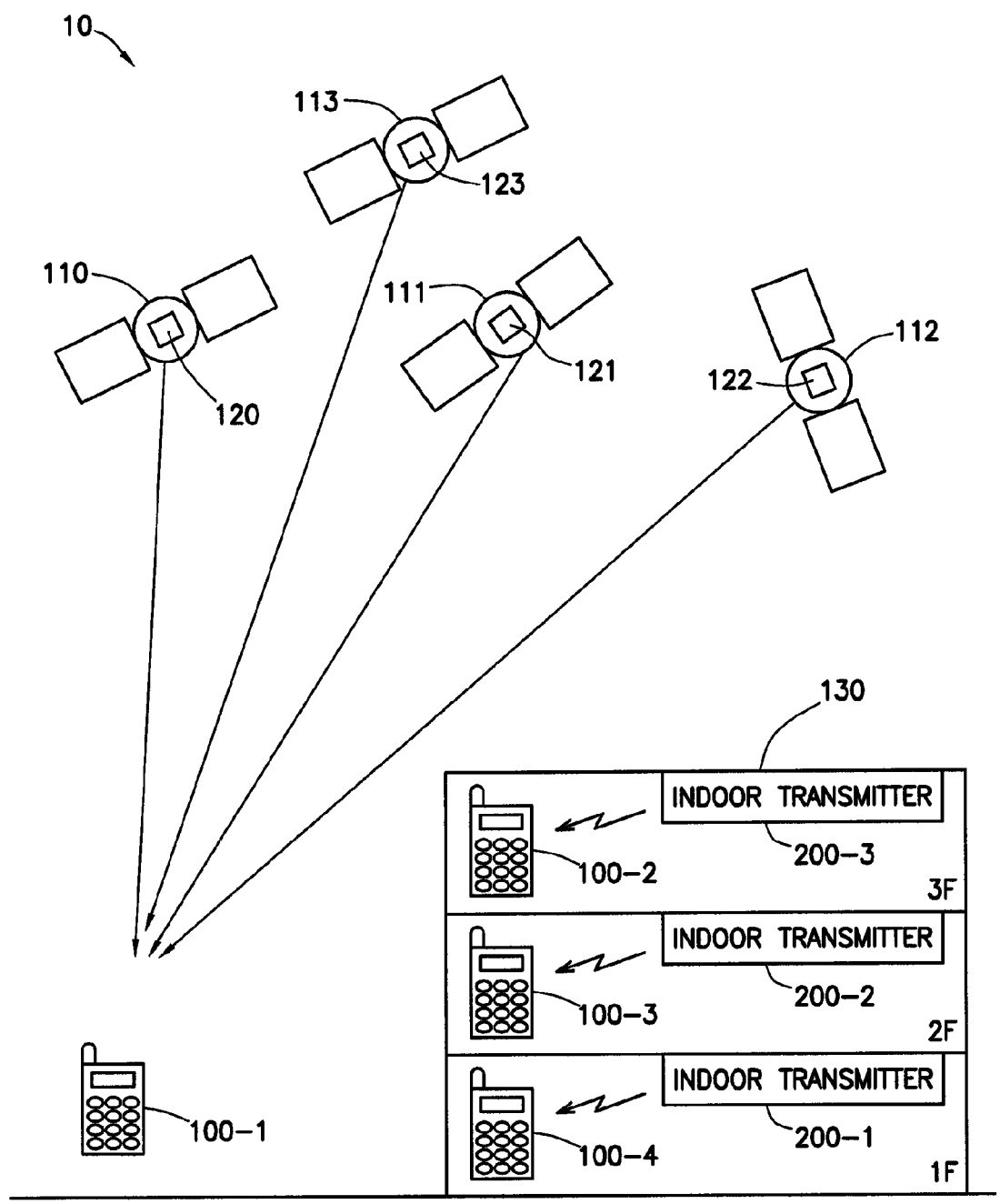
FIG. 1 shows a configuration of a positional information providing system 10 in accordance with a first embodiment of the present invention.

10 positional information providing system, 110, 111, 112 GPS satellite, 120, 121, 122 transmitter, 100-1, 100-2, 100-3, 100-4, 1000, 1160, 1170 positional information providing apparatus, 130 building, 200-1, 200-2, 200-3, 1110, 1120, 1130 1210 indoor transmitter, 1010, 1308 antenna, 1140, 1150 area, 1220 Internet, 1382 memory card, 1462 CD-ROM.

BEST MODES FOR CARRYING OUT THE INVENTION

In the following, embodiments of the present invention will be described with reference to the figures. In the following description, the same components are denoted by the same reference characters. Their names and functions are also the same. Therefore, detailed description thereof will not be repeated.

First Embodiment

Referring to FIG. 1, a positional information providing system 10 in accordance with the first embodiment of the present invention will be described. FIG. 1 shows a configuration of positional information providing system 10. Positional information providing system 10 includes GPS (Global Positioning System) satellites 110, 111, 112 and 113 flying at an altitude of 20,000 meters above the ground, emitting signals for positioning (hereinafter referred to as positioning signals), and positional information providing apparatuses 100-1 to 100-4 functioning as apparatuses for providing positional information. Positional information providing apparatuses 100-1 to 100-4 will be generally referred to as a positional information providing apparatus 100. Positional information providing apparatus 100 is, for example, a terminal having a conventional positioning device, such as a portable telephone, a car navigation system or other mobile positioning device.

Here, the positioning signal is a so-called spread spectrum signal and, by way of example, it is a so-called GPS signal. The signal, however, is not limited to the GPS signal. In the following, for simplicity of description, the positioning system will be described using GPS as an example. The present invention is also applicable to other satellite positioning systems (such as Galileo and GLONASS).

Central frequency of the positioning signal is, by way of example, 1547.42 MHz. Spreading frequency of the positioning signal is, by way of example, 1.023 MHz. Here, the frequency of positioning signal becomes the same as the C/A (Coarse and Access) signal in a L1 band of existing GPS. This means that an existing positioning signal receiving circuit (such as a GPS signal receiving circuit) can be used and, therefore, positional information providing apparatus 100 can receive the positioning signal without adding any new circuitry.

The positioning signal may be modulated with a rectangular wave of 1.023 MHz. In that case, if the data channel of the modulated signal is the same as that of the positioning signal planned for new transmission in the L1 band, the user can receive the positioning signal using a receiver that can receive and process the new GPS signal. The frequency of rectangular wave may be different from 1.023 MHz. The frequency for modulation is determined based on a trade-off with spectrum separation for avoiding interference of the demodulated signal with existing C/A signal and/or other signal.

GPS satellite 110 has a transmitter 120 mounted thereon, for emitting the positioning signal. GPS satellites 111, 112 and 113 have similar transmitters 121, 122 and 123 mounted, respectively. Positional information providing apparatuses 100-2, 100-3 and 100-4 having similar functions as positional information providing apparatus 100-1 are usable at places where radio wave reception is difficult, such as in a building 130. On the ceiling of the first floor of building 130, an indoor transmitter 200-1 is attached. Positional information providing apparatus 100-4 receives the positioning signal emitted from indoor transmitter 200-1. Similarly, indoor-transmitters 200-2 and 200-3 are respectively attached to ceilings of the second and third floors of building 130. Here, time of each of the indoor transmitters 200-1, 200-2 and 200-3 (hereinafter referred to as the "ground time") may be independent from the time of GPS satellites 110, 111, 112 and 113 (hereinafter referred to as the "satellite time"), and need not be in synchronization. It is desired that the satellites are synchronized in time with each other.

The spread spectrum signal emitted as a positioning signal from each transmitter is generated by modulating a navigation message with a PRN (Pseudo Random Noise) code. The navigation message includes time data, orbit information, almanac, and ionosphere correction data. Each transmitter 120 further has data (PRN-ID (Identification)) for identifying the transmitter 120 itself or for identifying the satellite on which the transmitter 120 is mounted.

Positional information providing apparatus 100 has data for generating each pseudo random noise code and a code generator. Receiving the positioning signal, positional information providing apparatus 100 executes a demodulation process, which will be described later, using a code pattern of pseudo random noise code allocated to each satellite, whereby it can identify from which satellite the received signal is emitted. Further, a new GPS signal includes PRN-ID in the data and, therefore, it is possible to prevent signal acquisition and tracking using an erroneous code pattern, which is likely when reception level is low.

Schematic configuration of the transmitter mounted on a GPS satellite is as follows. Each of transmitters 120, 121 and 122 includes an atomic clock, a storage storing data, an oscillation circuit, a processing circuit for generating the positioning signal, an encoding circuit for spread-spectrum coding of the signal generated by the processing circuit, and a transmission antenna. The storage stores navigation message having ephemeris, almanac of each satellite, ionosphere correction data and the like, and PRN-ID.

The processing circuit generates a message for transmission, using time information from the atomic clock and various data stored in the storage.

It is noted that a code pattern for the pseudo random noise code for spread-spectrum coding is defined beforehand for each transmitter 120. Each code pattern differs transmitter by transmitter (that is, GPS satellite by satellite). The encoding circuit effects spectrum-spreading of the message, using the pseudo random noise code as such. Transmitter 120 converts the thus encoded signal to high frequency, and emits the resulting signal to the space through the transmission antenna.

As described above, transmitter 120 emits spread spectrum signal not causing harmful interference with other transmitters. Here, not causing "harmful interference" may be ensured by the output level so restrained as to prevent any interference. Alternatively, it can be realized by a manner of spreading spectrum. The signal is transmitted using, for example, a carrier wave referred to as L1 band. Transmitters 120, 121 and 122 emit positioning signals having the same frequency, for example, in accordance with spread spectrum communication system. Therefore, when positioning signals transmitted from respective satellites are received by positional information providing apparatus 100-1, respective positioning signals can be received without cross-talk. As to the positioning signals from indoor transmitters on the ground, similar to the signals transmitted from satellites, positioning signals from the plurality of indoor transmitters can be received without cross-talk.

Figure 2:
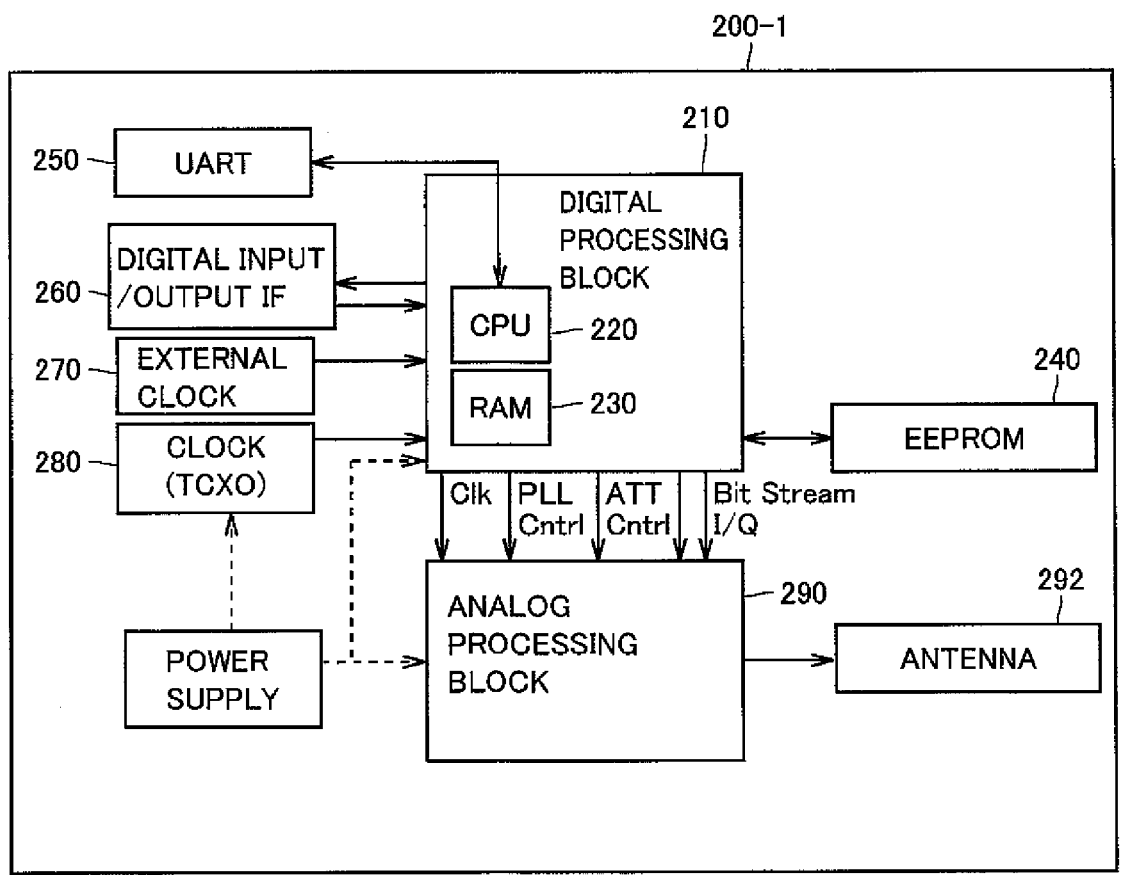
FIG. 2 is a block diagram showing a hardware configuration of an indoor transmitter 200-1.

Referring to FIG. 2, indoor transmitter 200-1 will be described. FIG. 2 is a block diagram representing a hardware configuration of indoor transmitter 200-1.

Indoor transmitter 200-1 includes a digital processing block 210, an EEPROM (Electrically Erasable and Programmable Read Only Memory) 240 electrically connected to digital processing block 210, an UART 250 electrically connected to digital processing block 210, a digital input/output interface 260 electrically connected to digital processing block 210, a clock 280 electrically connected to digital processing block 210, an analog processing block 290 electrically connected to digital processing block 210, an antenna 292 electrically connected to analog processing block 290, and a power supply 294. Digital processing block 210 includes a CPU (Central Processing Unit) 220 and an RAM (Random Access Memory) 230.

EEPROM 240 stores a program to be executed by CPU 220, data representing location where indoor transmitter 200-1 is installed, and so on. The program or data is read from EEPROM 240 and transferred to RAM 230 when indoor transmitter 200-1 is powered on. EEPROM 240 may further store data input from the outside of indoor transmitter 200-1. The storage for storing the program or data is not limited to EEPROM 240. A storage at least capable of storing data in non-volatile manner may be used. As will be described later, when data is output from the outside, any storage that allows data writing may be used. Data structure of EEPROM 240 will be described later.

Digital processing block 210 generates data as a source of a signal to be transmitted by indoor transmitter 200-1 as a signal for positioning. Digital processing block 210 sends the generated data as a bit stream, to analog processing block 290.

Clock 280 supplies a clock signal defining an operation of CPU 220 or a clock signal for generating a carrier wave, to digital processing block 210.

Digital input/output interface 260 is capable of monitoring internal state (such as "PLL Cntrl" signal) of the transmitter. Alternatively, digital input/output interface 260 may receive from the outside, an input of a code pattern of pseudo noise code for spread-modulating the signal emitted from indoor transmitter 200-1, or an input of data defining a transmission output. Further, it may receive an input of other data to be emitted from indoor transmitter 200-1. The other data includes text data representing the location where the indoor transmitter 200-1 is installed. If indoor transmitter 200-1 is installed in commercial facilities such as a department store, advertisement data may be input to indoor transmitter 200-1 as the other data.

When input to indoor transmitter 200-1, the code pattern of pseudo spread code is written to a pre-defined area in EEPROM 240. Thereafter, the written PRN-ID is included in the signal for positioning. Other data are also written in areas secured in advance dependent on the data type, in EEPROM 240.

UART 250 is used for adjusting indoor transmitter 200-1. External clock 270 is used for adjusting indoor transmitter 200-1, similar to UART 250. By way of example, external clock 270 is used for receiving frequency of a power line (not shown) and calibrating transmission frequency of the signal for positioning.

Figure 5:
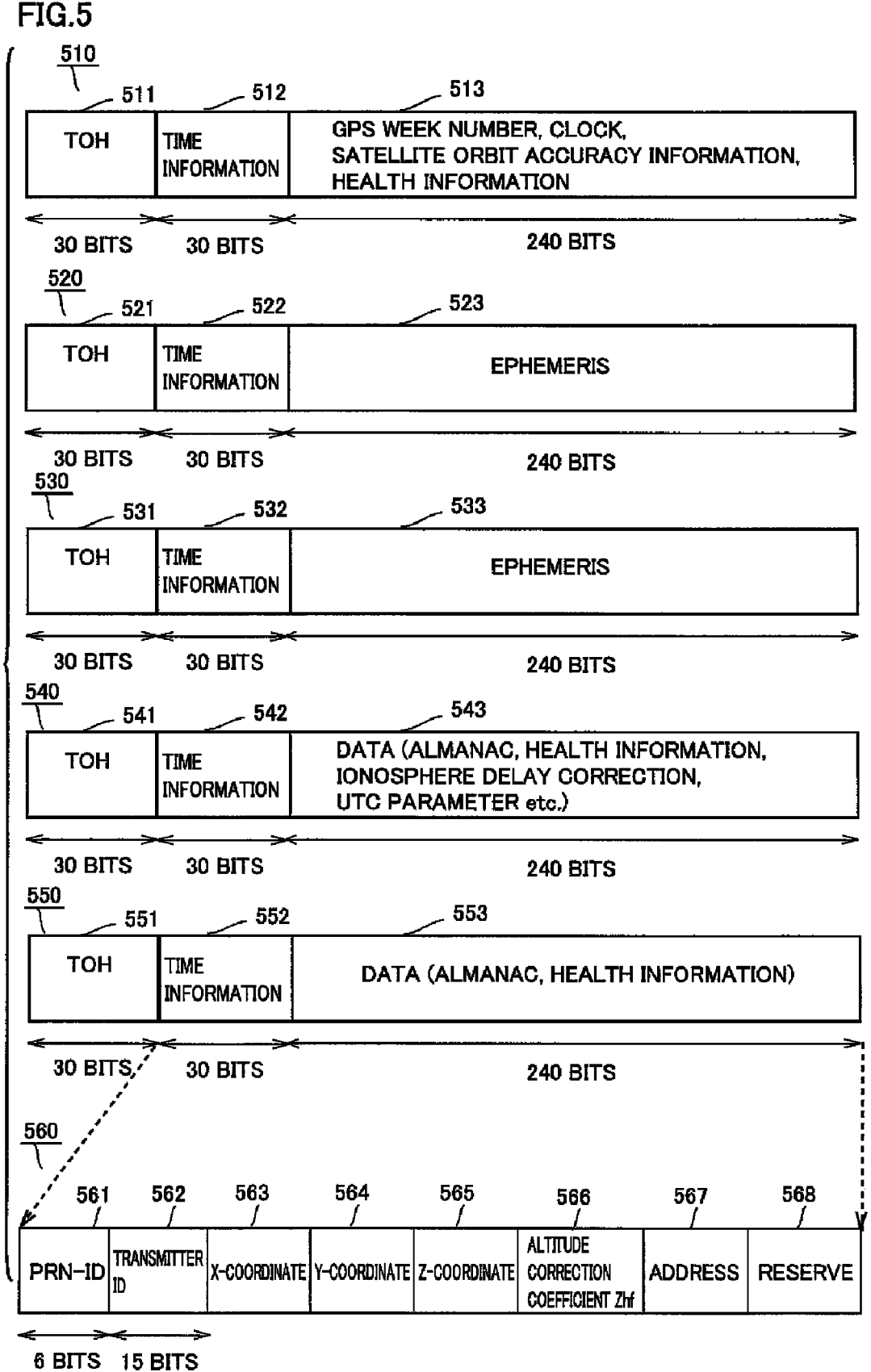
FIG. 5 represents positioning signals transmitted from the transmitter.

Analog processing block 290 modulates carrier wave of 1.57542 GHz using a bit stream output from digital processing block 210 to generate a transmission signal, and outputs it to antenna 292. The signal is emitted from antenna 292. In this manner, a signal having the same configuration as that of the signal for positioning is emitted from indoor transmitter 200-1. Here, the contents of the signal are not perfectly the same as the contents of the positioning signal emitted from the satellite. An example of the configuration of signal emitted from indoor transmitter 200-1 will be described later (FIG. 5).

Power supply 294 supplies electric power to various components of indoor transmitter 200-1. Power supply 294 may be built in indoor transmitter 200-1 as shown in FIG. 2, or electric power may be supplied from the outside.

In the foregoing description, CPU 220 is used as an arithmetic processing unit for realizing the process in digital processing unit 210. Other arithmetic processing unit may be used. Further, as the operation realized by indoor transmitter 200-1 is not complicated, digital processing block 210 may be implemented by an electric circuitry formed to realize various processes, in place of CPU 220.

Further, though a clock signal (Clk) is supplied from digital processing block 210 to analog processing block 290 in FIG. 2, it may be directly supplied from clock 280 to analog processing block 290.

In the present embodiment, digital processing block 210 and analog processing unit 290 are shown separately for clearer description. Physically, these blocks may be mounted together on one chip.

Figure 3:
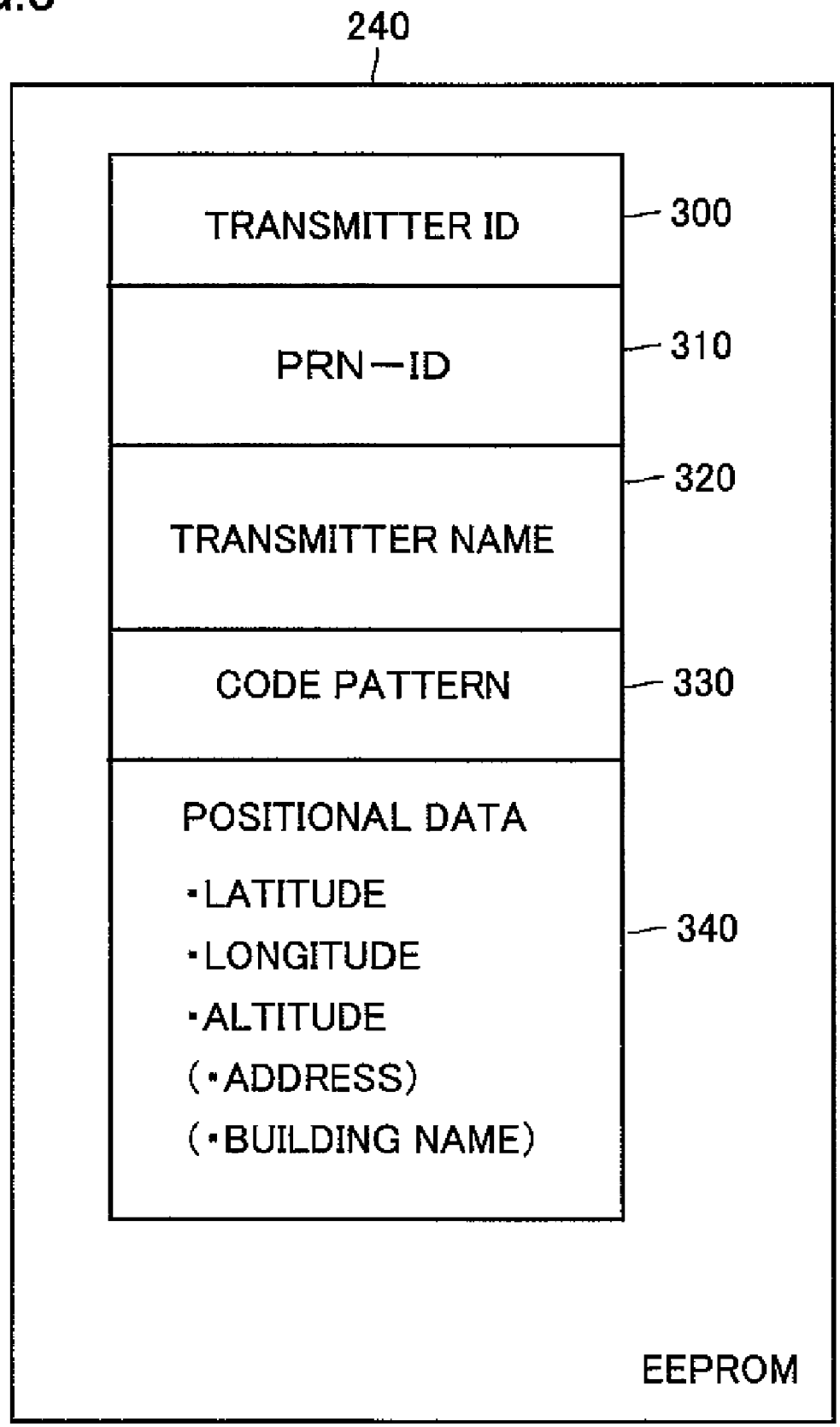
FIG. 3 is a conceptual diagram showing a manner of data storage in an EEPROM 240 provided in indoor transmitter 200-1.

Referring to FIG. 3, data structure in indoor transmitter 200-1 will be described. FIG. 3 is a conceptual illustration showing a manner of data storage in EEPROM 240 provided in indoor transmitter 200-1. EEPROM 240 includes areas 310 to 340 for storing data.

Area 300 stores a transmitter ID, as a number for identifying the transmitter. A transmitter ID is, for example, numerals and/or alphabets or other combination written in non-volatile manner in the memory, when the transmitter is manufactured. A PRN-ID of a pseudo spread code allotted to the transmitter is stored in an area 310. The name of the transmitter is stored as text data in an area 320.

A code pattern of the pseudo spread code allotted to the transmitter is stored in an area 330. The code pattern of the pseudo spread code is selected from a plurality of finite number of code patterns allotted beforehand to the positional information providing system in accordance with the embodiment of the present invention, and it is a code pattern different from the code pattern of the pseudo spread code allotted to each satellite. Further, as described above, the code pattern of the pseudo spread code is changeable to another code pattern input through digital input/output interface 260.

The code pattern of the pseudo spread code allotted to the present positional information providing system is finite in number. The number of indoor transmitters is different dependent on the largeness of installation site of the transmitters or the structure of installation site (for example, floor number of a building). A plurality of indoor transmitters larger in number than the number of code patterns may possibly be used. Therefore, there may be a plurality of transmitters having the same code pattern of the pseudo spread code. In that case, the site of installation of the transmitters having the same code pattern may be determined in consideration of signal output. This prevents simultaneous reception of a plurality of positioning signals using the same code pattern of pseudo spread code by the same positional information providing apparatus.

Positional data for specifying the location where indoor transmitter 200-1 is installed is stored in an area 340. The positional data is represented, by way of example, as a combination of latitude, longitude and altitude. In area 320, in addition to or in place of the positional data, an address or a name of building may be stored.

Figure 4:
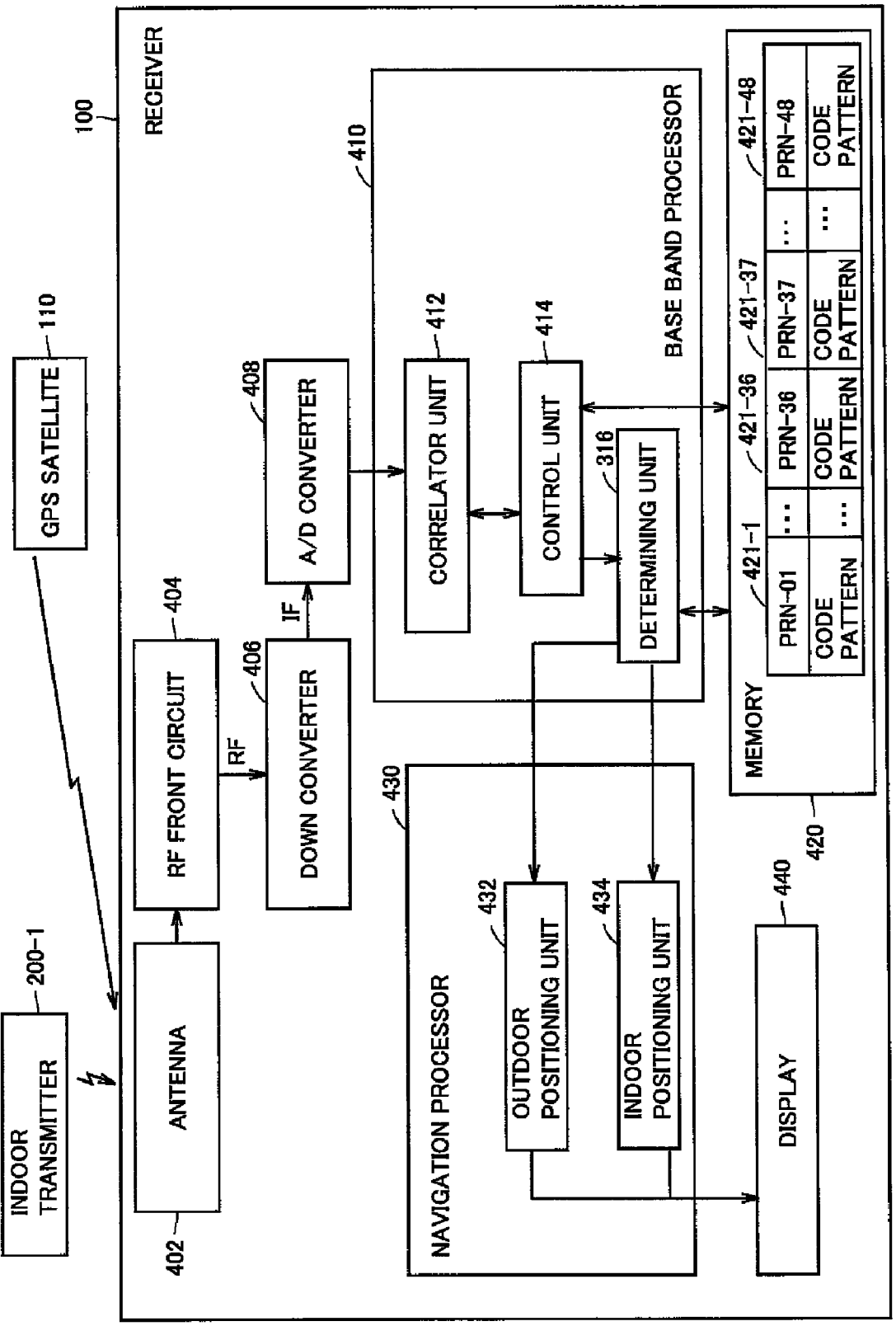
FIG. 4 is a block diagram representing a hardware configuration of a positional information providing apparatus 100-1.

Referring to FIG. 4, positional information providing apparatus 100-1 will be described. FIG. 4 is a block diagram representing a hardware configuration of positional information providing apparatus 100-1.

Positional information providing apparatus 100 includes an antenna 402, an RF (Radio Frequency) front circuit 404 electrically connected to antenna 402, a down converter 406 electrically connected to RF front circuit 404, an A/D (Analog to Digital) converter 408 electrically connected to down converter 406, a base band processor 410 electrically connected to A/D converter 408, a memory 420 electrically connected to base band processor 410, a navigation processor 430 electrically connected to base band processor 410, and a display 440 electrically connected to navigation processor 430.

Memory 420 includes a plurality of areas for storing code patterns of pseudo noise codes as data for identifying each emission source of the positioning signal. By way of example, according to an aspect, when 48 code patterns are used, memory 420 includes areas 421-1 to 421-48, as shown in FIG. 4. According to another aspect, when a larger number of code patterns are used, larger number of areas are secured in memory 420. On the contrary, it is also possible that code patterns smaller in number than the areas secured in memory 420 are used.

Consider an example in which 48 code patterns are used. Here, if 24 satellites are used for the satellite positioning system, 24 identification data for identifying respective satellites and 12 spare data are stored in areas 421-1 to 421-36. Here, in area 421-1, for example, a code pattern of the pseudo noise code for the first satellite is stored. By reading the code pattern from here and performing cross-correlation process with the received signal, signal tracking and deciphering of navigation message included in the signal become possible. Though a method in which the code pattern is stored and read has been described as an example here, a method is also possible in which the code pattern is generated by a code pattern generator. The code pattern generator is realized, for example, by combining two feedback registers. Structure and operation of the code pattern generator are readily understood by a person skilled in the art. Therefore, detailed description thereof will not be repeated here.

Similarly, the code patterns of the pseudo noise code allotted to indoor transmitters emitting positioning signals are stored in areas 421-37 to 421-48. For example, the code pattern of the pseudo noise code allotted to the first indoor transmitter is stored in area 432-37. In the present embodiment, indoor transmitters having 12 code patterns are usable. Here, indoor transmitters may be arranged such that indoor transmitters having the same code pattern are not placed in a scope of coverage of one positional information providing apparatus. By such an arrangement, it becomes possible to install indoor transmitters larger in number than 12 on one floor of the building 130.

Base band processor 410 includes a correlator unit 412 receiving as an input a signal output from A/D converter 408, a control unit 414 controlling an operation of correlator unit 412, and a determining unit 416 determining an emission source of the positioning signal based on the data output from control unit 414. Navigation processor 430 includes an outdoor positioning unit 432 for measuring the outdoor position of positional information providing apparatus 100 based on the signal output from determining unit 416, and an indoor positioning unit 434 for extracting information representing indoor position of positional information providing apparatus 100 based on the data output from determining unit 416.

Antenna 402 can receive positioning signals emitted from GPS satellites 110, 111 and 112, respectively, and a positioning signal emitted from indoor transmitter 200-1. Further, when positional information providing apparatus 100 is implemented as a portable telephone, antenna 420 can transmit/receive signal for wireless telephone or data for data communication, in addition to the signals mentioned above.

RF front circuit 404 receives the signals received by antenna 402 and performs noise reduction, or filtering process for outputting signals only in a predefined bandwidth. The signal output from RF front circuit 404 is input to down converter 406.

Down converter 406 amplifies the signal output from RF front circuit 404, and outputs it as an intermediate frequency signal. The signal is input to A/D converter 408. A/D converter 408 performs digital conversion of the input intermediate frequency signal, to a digital data. The digital data is input to base band processor 410.

In base band processor 410, correlator unit 412 performs correlating process between the received signal and the code pattern read by control unit 414 from memory 420. For instance, correlator unit 412 performs matching of the two different code patterns of which code phase differs by 1 bit provided by control unit 414 with the digital data transmitted from A/D converter 408. Using each code pattern, correlator unit 412 tracks the positioning signal received by positional information providing apparatus 100, and specifies a code pattern that has a sequence matching the bit sequence of the positioning signal. Consequently, the code pattern of the pseudo noise code is specified and, therefore, positional information providing apparatus 100 can determine from which satellite or from which indoor transmitter the received positioning signal has been transmitted. Further, it is possible for positional information providing apparatus 100 to demodulate and decipher the message, using the specified code pattern.

Specifically, determining unit 416 makes such determination as described above, and transmits data in accordance with the result of determination to navigation processor 430. Determining unit 416 determines whether the PRN-ID included in the received positioning signal is the PRN-ID allotted to the transmitter other than the transmitter mounted on the GPS satellite.

Here, an example will be described in which 24 GPS satellites are used in the positioning system. Here, 36 pseudo noise codes, including spare codes, are used. In this example, PRN-01 to PRN-24 are used as numbers (PRN-ID) for identifying respective GPS satellites, and PRN-25 to PRN-36 are used as numbers for identifying spare satellites. The spare satellite refers to a satellite launched in addition to the originally launched satellites. Specifically, such a satellite may be launched in case a GPS satellite or a transmitter or the like mounted on a GPS fails.

Further, it is assumed that 12 code patterns of pseudo noise code are allotted to transmitters (such as indoor transmitter 200-1 and the like) other than the transmitters mounted on the GPS satellites. Here, numbers different from PRN-IDs allotted to the satellites, for example, PRN-37 to PRN-48, are allotted to respective transmitters. Therefore, it follows that in the present example, there are 48 PRN-IDs. Here, PRN-37 PRN-48 are allotted to indoor transmitters in accordance with the arrangement of indoor transmitters. Therefore, if used transmission output is not high enough to cause interference of signals emitted from each of the indoor transmitters, the same PRN-ID may be used for different indoor transmitters. This arrangement allows use of transmitters larger in number than the PRN-IDs allotted for the transmitters on the ground.

Therefore, determining unit 416 makes a reference to code pattern 422 of the pseudo noise code stored in memory 420 to determine whether the code pattern obtained from the received positioning signal matches the code pattern allotted to the indoor transmitter. If these code patterns match, determining unit 416 determines that the positioning signal has been emitted from the internal transmitter. Otherwise, determining unit 416 determines that the signal has been emitted from a GPS satellite, and determines, with reference to the code patterns stored in memory 402, to which GPS satellite the obtained code pattern has been allotted. Though an example in which the code pattern is used for determination has been described, the determination may be made by comparison of other data. For example, comparison using PRN-ID may be used for the determination.

If the received signal is emitted from each GPS satellite, determining unit 416 transmits the data obtained from the specified signal to outdoor positioning unit 432. The data obtained from the signal includes navigation data. If the received signal is emitted from indoor transmitter 200-1 or the like, determining unit 416 transmits the data obtained from the signal to indoor positioning unit 434. The data represents coordinate values set in advance, as data for specifying the position of indoor transmitter 200-1. According to another aspect, a number identifying the transmitter may be used.

In navigation processor 430, outdoor positioning unit 432 executes a process for calculating the position of positional information providing apparatus 100 based on the data transmitted from determining unit 416. Specifically, using data included in signals emitted from three or more (preferably, four or more) GPS satellites, outdoor positioning unit 432 calculates propagation time of each signal, and based on the result of calculation, finds the position of positional information providing apparatus 100. The process is executed by a known method of satellite positioning. The process can be readily understood by a person skilled in the art, and therefore, detailed description thereof will not be repeated here.

On the other hand, in navigation processor 430, indoor positioning unit 434 executes a positioning process when the positional information providing apparatus 100 exists indoors, based on the data output from determining unit 416. As will be described later, indoor transmitter 200-1 emits a positioning signal including data (time data) for specifying a location. Therefore, if the positional information providing apparatus 100 receives such a signal, the data may be taken out from the signal, and the data may be used as the position of positional information providing apparatus 100. Indoor positioning unit 434 performs this process. The data calculated by outdoor positioning unit 432 or indoor positioning unit 434 are used for display on display 440. Specifically, the data are incorporated in the data for displaying an image, and an image representing the measured position or displaying the location where indoor transmitter 200-1 is installed is generated and displayed on display 440.

Referring to FIG. 5, the positioning signal transmitted from the transmitter will be described. FIG. 5 shows a structure of a signal 500 emitted by a transmitter mounted on a GPS satellite. Signal 500 is formed of five sub frames of 300 bits, that is, sub frames 510 to 550. Sub frames 510 to 550 are repeatedly transmitted by the transmitter. Sub frames 510 to 550 each include 300 bits, and transmitted at the bit rate of 50 bps (bit per second). Therefore, in this example, each sub frame is transmitted in 6 seconds.

The first sub frame 510 includes a transport overhead 511 of 30 bits, time information 512 of 30 bits, and message data 513 of 240 bits. Time information 512 specifically includes time information obtained when sub frame 510 is generated, and a sub frame ID. Here, sub frame ID represents an identification number for distinguishing the first sub frame 510 from other sub frames. Message data 153 includes GPS week number, clock information, health information of the GPS satellite, and orbit accuracy information.

The second sub frame 520 includes a transport overhead 521 of 30 bits, time information 522 of 30 bits, and message data 523 of 240 bits. Time information 522 has the same structure as time information 512 of the first sub frame 510. Message data 523 includes ephemeris. Here, the ephemeris (broadcast ephemeris) represents orbit information of the satellite emitting the positioning signal. The ephemeris is highly precise information updated successively by a control station overseeing the satellite navigation.

The third sub frame 530 has the same structure as that of the second sub frame 520. Specifically, the third sub frame 530 includes a transport overhead 531 of 30 bits, time information 532 of 30 bits, and message data 533 of 240 bits. Time information has the same structure as that of time information 512 of the first sub frame 510. Message data 533 includes ephemeris.

The fourth sub frame 540 includes a transport overhead 541 of 30 bits, time information 542 of 30 bits, and message data 543 of 240 bits. Different from other message data 513, 523 and 533, message data 543 includes almanac information, summary of satellite health information, ionospheric delay information, UTC (Coordinated Universal Time) parameter and the like.

The fifth sub frame 550 includes a transport overhead 551 of 30 bits, time information 552 of 30 bits, and message data 553 of 240 bits. Message data 553 includes almanac information and the summary of satellite health information. Message data 543 and 553 each consist of 25 pages, and on each page, different pieces of information described above are defined. Here, the almanac information represents schematic orbit of satellites and, it includes information not only of the corresponding satellite but also that of all GPS satellites. When transmission of sub frames 510 to 550 is repeated 25 times, the process returns to the first page, and emission of the same pieces of information restarts.

Sub frames 510 to 550 are transmitted from each of the transmitters 120, 121 and 122. When sub frames 510 to 550 are received by positional information providing apparatus 100, the position of positional information providing apparatus 100 is calculated based on each piece of maintenance/management information included in transport overheads 511 to 551, time information 512 to 552 and message data 513 to 553.

A signal 560 has the same data length as each of the message data 513 to 553 included in sub frames 510 to 550. The signal 560 is different from sub frames 510 to 550 in that in place of the orbit information represented as ephemeris (message data 523, 533), it has data representing the position of emission source of the signal 560.

Specifically, signal 560 includes PRN-D 561 of 6 bits, a transmitter ID 562 of 15 bits, an X-coordinate value 563, a Y-coordinate value 564, a Z-coordinate value 565, an altitude correction coefficient (Zhf) 566, an address 567, and a reserve 568. Signal 560 is transmitted from indoor transmitters 200-1, 200-2 and 200-3, in place of message data 513 to 553 included in sub frames 510 to 550.

PRN-ID 561 is an identification number of code patterns of a group of pseudo noise codes allotted beforehand to transmitters (for example, indoor transmitters 200-1, 2003 and 200-3) as the emission source of the signal 560. Though PRN-ID 561 is different from the identification number of code patterns of the group of pseudo noise codes allotted to respective transmitters mounted on the GPS satellites, these are the numbers allotted to the code patterns generated from the code sequence of the same system. When the positional information providing apparatus obtains any of the code patterns of pseudo noise codes allotted to indoor transmitters, from the received signal 560, it becomes possible to specify whether the signal corresponds to the sub frame 510 to 550 transmitted from a satellite, or the signal 560 transmitted from an indoor transmitter.

X-coordinate value 563, Y-coordinate value 564, and Z-coordinate value 565 are data representing the position where indoor transmitter 200-1 is mounted. X-coordinate value 563, Y-coordinate value 564, and Z-coordinate value 565, by way of example, indicate latitude, longitude and altitude, respectively. Altitude correction coefficient 566 is used for correcting the altitude specified by Z-coordinate value 565. Altitude correcting coefficient 566 is not an essential data item. Therefore, if accuracy higher than the altitude specified by Z-coordinate value 565 is unnecessary, the coefficient may not be used. In that case, data of "NULL", for example, is stored in the area allotted to altitude correcting coefficient 566.

Figure 6:
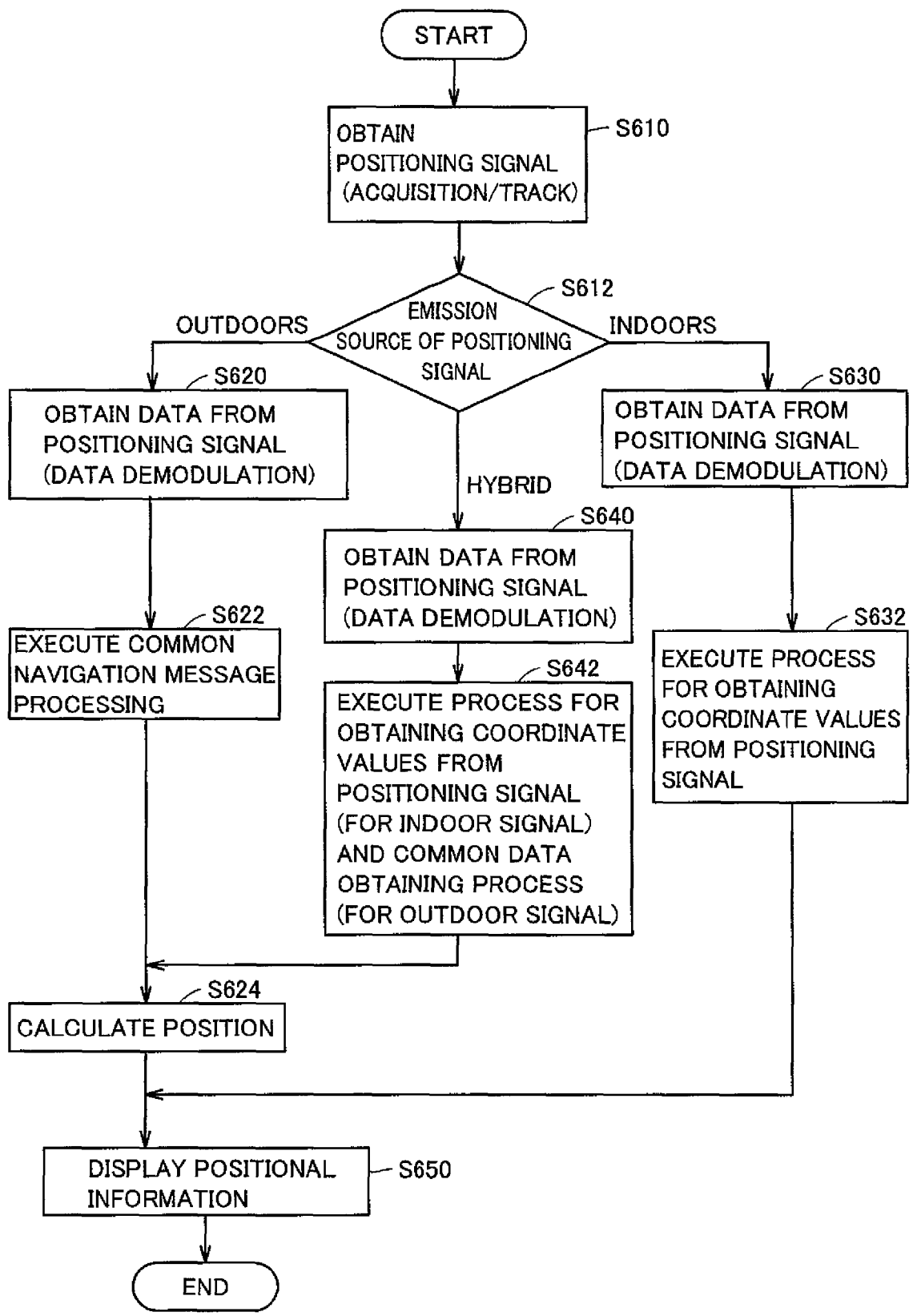
FIG. 6 is a flowchart representing a process procedure executed by positional information providing apparatus 100.

Referring to FIG. 6, a control structure of positional information providing apparatus 100 will be described. FIG. 6 is a flowchart representing a process procedure executed by base band processor 410 and navigation processor 430 of positional information providing apparatus 100.

At step S610, positional information providing apparatus 100 obtains (tracks and acquires) the positioning signal. Specifically, base band processor 410 receives as an input the received positional signal (digitally converted data) from ATD converter 408. Base band processor 410 generates, as a replica of pseudo noise code, a code pattern of which code phase is different with possible delay reflected, and detects presence/absence of correlation between the code pattern and the received positioning signal. The number of generated code patterns is, for example, twice the number of bits of the code pattern. By way of example, assume that the chip rate is 1023 bits. Then, 2046 code patterns each having the delay of one half bit, that is, code phase difference, can be generated. The process of establishing correlation with the received signal using each code pattern is executed. When an output not lower than a predefined intensity is detected in the correlation process, base band processor 410 locks the code pattern, and can specify the satellite that emitted the positional signal, from the code pattern. There is only one pseudo noise code that has the bit sequence of the code pattern of interest. Therefore, the pseudo noise code used for spread spectrum coding of the received positioning signal can be specified.

As will be described later, the process for establishing correlation between the signal obtained by reception and the locally generated replica code pattern may be realized as a parallel process.

At step S612, base band processor 410 specifies the emission source of the positioning signal. Specifically, determining unit 416 specifies the emission source of the signal based on the PRN-ID (see memory 420 of FIG. 4) corresponding to the transmitter that uses the code pattern of pseudo noise signal used at the time of modulation for generating the signal. If the positioning signal has been emitted outdoors, the control proceeds to step S620. If the positioning signal is emitted indoors, the control proceeds to step S630. If a plurality of received signals include signals emitted indoors and outdoors, the control proceeds to step S640.

At step S620, positional information providing apparatus 100 demodulates the positioning signal, thereby to obtain data included in the signal. Specifically, outdoor positioning unit 432 of navigation processor 430 superposes the code pattern temporarily stored in memory 420 (the above-described "locked" code pattern, hereinafter referred to as the "locked code pattern") on the positioning signal, to obtain navigation message from the sub frame forming the signal. At step S622, outdoor positioning unit 432 executes a common navigation message process for calculating the position, using four or more obtained navigation messages.

At step S624, outdoor positioning unit 432 executes a process, on which result the position of positional information providing apparatus 100 is calculated. For instance, if the positional information providing apparatus 100 has received positioning signals emitted from four or more satellites, distance calculation is done using orbit information, time information and the like of each satellite, included in the navigation message demodulated from each signal.

According to another aspect, if positional information providing apparatus 100 has received a positioning signal emitted by a satellite (outdoor signal) and a signal emitted by an indoor transmitter (indoor signal) (that is, when step S624 is executed following step S642), the signal used for position calculation is determined based on the intensity of indoor and outdoor signals. By way of example, if the indoor signal has higher intensity than the outdoor signal, the indoor signal is selected, and coordinate values included in the indoor signal are used as the position of positional information providing apparatus 100.

At step S630, positional information providing apparatus 100 demodulates the positioning signal, to obtain data included in the signal. Specifically, indoor positioning unit 434 superposes the locked code pattern on the positioning signal transmitted from base band processor 410, whereby the message data is obtained from the sub frame forming the positioning signal. The message data is included in the positioning signal emitted by the indoor transmitter, in place of the navigation message data included in the positioning signal transmitted from a satellite. Therefore, it is preferred that the data length of message data is the same as that of navigation data.

At step S632, indoor positioning unit 434 obtains coordinate values from the data (that is, data for specifying the installation site of indoor transmitter (for example, X-coordinate 563, Y-coordinate 564 and Z-coordinate 565 of signal 560 shown in FIG. 5)). If text information representing the installation site or an address of the installation site is included in the frame in place of such coordinate values, such text information is obtained.

At step S640, positional information providing apparatus 100 demodulates the positioning signal, thereby to obtain the data included in the signal. Specifically, outdoor positioning unit 432 superposes the locked code pattern on the positioning signal transmitted by base band processor 410, thereby to obtain the data in the sub frame forming the positioning signal. Here, it follows that the positional information providing apparatus 100 receives both the signal from a satellite and a signal from an indoor transmitter and, hence, it is operating in a so-called "hybrid" mode. Therefore, navigation message having synchronized time data is obtained from the signal from each satellite and data having positional information such as the coordinate values and the like mentioned above is obtained from the signal from indoor transmitter.

At step S642, indoor positioning unit 434 performs a process for obtaining X-coordinate value 563, Y-coordinate value 564 and Z-coordinate value 565 from the positioning signal emitted by indoor transmitter 200-1, and obtains and processes navigation message from the positioning signal emitted by the GPS satellite. Then, control proceeds to step S624.

At step S650, navigation processor 430 executes a process for displaying positional information on display 440, based on the result of position calculation. Specifically, image data for displaying the obtained coordinates, or data for displaying the installation site of indoor transmitter 200-1 is generated and transmitted to display 440. Based on such data, display 440 displays the positional information of positional information providing apparatus 100 on a display area.

Figure 7:
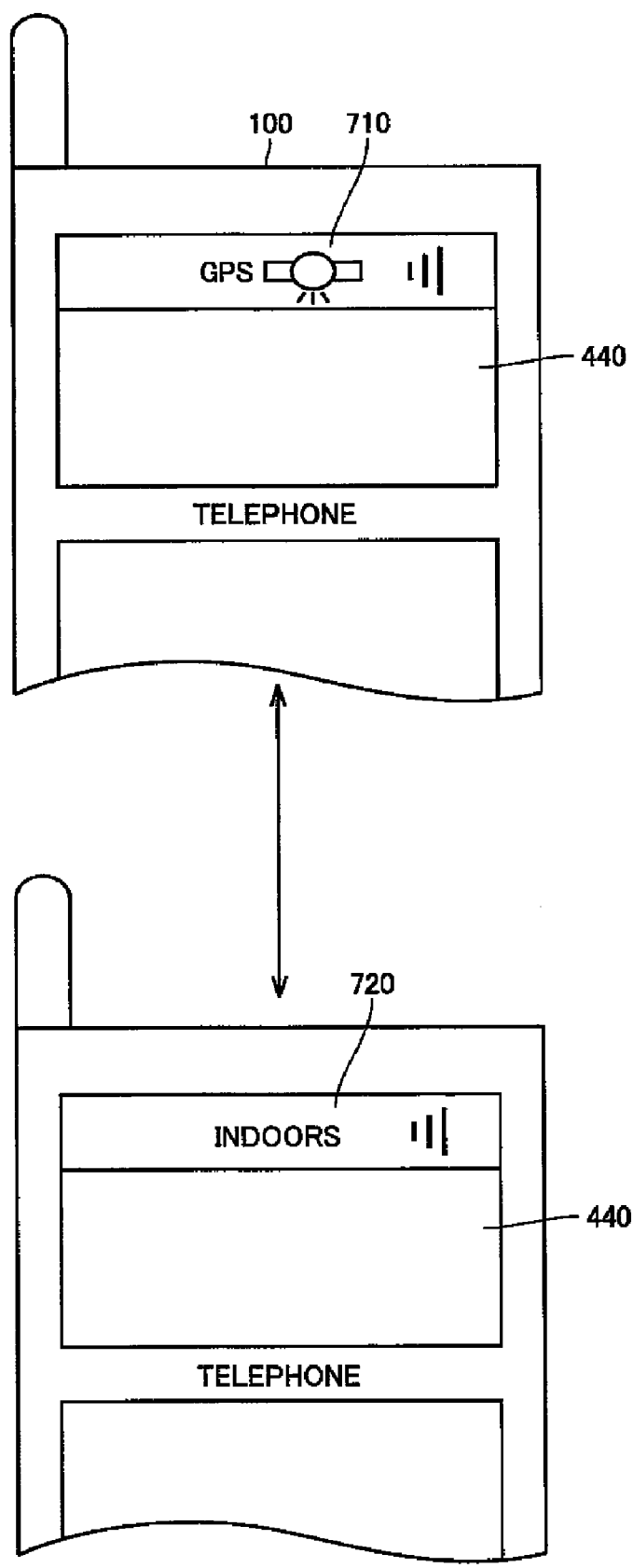
FIG. 7 shows an image display on a display 440 of positional information providing apparatus 100.

Referring to FIG. 7, the manner of display of positional information of positional information providing apparatus 100 will be described. FIG. 7 shows an image display on display 440 of positional information providing apparatus 100. When positional information providing apparatus 100 receives a positioning signal emitted from each GPS satellite outdoors, display 440 displays an icon 710 indicating that the positional information is being received based on the positioning signal. When the user of positional information providing apparatus 100 moves indoors, positional information providing apparatus 100 can no longer receive the positioning signal emitted from each GPS satellite. Rather, positional information providing apparatus 100 receives a signal emitted, for example, by indoor transmitter 200-1. The signal is transmitted in the same manner as the positioning signal emitted from the GPS signal, as described above. Therefore, positional information providing apparatus 100 performs the same process as executed when a positional signal is received from a satellite, on the signal. When positional information providing apparatus 100 obtains positional information from the signal, an icon 720 indicating that the positional information is obtained based on the signal emitted from a transmitter installed indoors is displayed on display 440.

As described above, positional information providing apparatus 100 in accordance with the first embodiment of the present invention receives, at places where radio wave from a GPS satellite cannot be received such as indoors or a ground mall, radio wave emitted from a transmitter (such as indoor transmitters 200-1 200-2 and 200-3) installed at the site. Positional information providing apparatus 100 obtains information specifying the position of the transmitter (such as coordinate values or address) from the radio wave, and displays it on display 440. Thus, the user of positional information providing apparatus 100 knows where he/she is at present. In this manner, even at a place where the positioning signal cannot be directly received, positional information can be provided.

In this manner, stable indoor signal reception becomes possible. Further, even indoors, positional information can be provided with the stable accuracy of about a few meters.

The ground time (time of transmitter such as indoor transmitter 200-1) and the satellite time may be independent from each other, and synchronization is unnecessary. Therefore, the cost for manufacturing indoor transmitters is not much increased. Further, after the start of operation of the positional information providing system, it is unnecessary to establish time synchronization of indoor transmitters, and hence operation is easy.

Each signal emitted from each indoor transmitter includes information itself for specifying the location where the transmitter is installed. Therefore, it is unnecessary to calculate positional information based on signals emitted from a plurality of satellites, and therefore, positional information can be extracted from the signal emitted from a single transmitter.

Further, as the signal emitted from a single indoor transmitter is received, the position where the signal is received can be specified. Therefore, as compared with other conventional positioning system such as GPS, the system for providing position can be realized in a simple manner.

Here, positional information providing apparatus 100 does not require dedicated hardware for receiving the signal emitted by indoor transmitter 200-1, and it can be implemented by hardware for realizing the conventional positioning system. Therefore, it is unnecessary to design from scratch the hardware for applying the technique of the present embodiment, and hence, cost increase of positional information providing apparatus 100 can be prevented, promoting wider use. Further, a positional information providing apparatus that does not increase or complicate the circuit scale can be provided.

Specifically, memory 420 of positional information providing apparatus 100 holds PRN-ID defined in advance for the indoor transmitter and/or satellite. Positional information providing apparatus 100 has a program for the process of determining, based on the PRN-ID, whether the received radio wave is emitted from a satellite or from an indoor transmitter. The program is realized by an arithmetic processing unit such as a base band processor. Alternatively, a circuit element for determination may be changed to a circuit element including functions realized by the program, whereby the positional information providing apparatus 100 can be formed.

If the positional information providing apparatus 100 is implemented as a portable telephone, the obtained information may be held in a non-volatile memory 420 such as a flash memory. At the time of emission from the portable telephone, the data held in memory 420 may be transmitted to the destination. By such an approach, positional information of emission source, that is, the positional information obtained by positional information providing apparatus 100 as the portable telephone from the indoor transmitter, is transmitted to the base station that relays the communication. The base station holds the positional information as communication record, together with the date and time of reception. If the destination is an emergency contact number (110 in Japan), the positional information of emission source may directly be notified. Thus, similar to the conventional notification of emission source of an emergency call from a fixed telephone, notification of an emission source from a mobile body becomes possible.

With regard to a transmitter installed at a specific location, a transmitter capable of emitting a signal similar to that emitted by a transmitter mounted on a positioning satellite may be used to realize the positional information providing system. Therefore, it becomes unnecessary to redesign the transmitter from scratch.

The positional information providing system in accordance with the present embodiment uses a spread spectrum signal as the signal for positioning. Transmission of this signal can lower electric power per frequency, and therefore, radio wave management could be easier as compared with a conventional RF tag. As a result, construction of positional information providing system becomes easier.

<First Modification>

Figure 8:
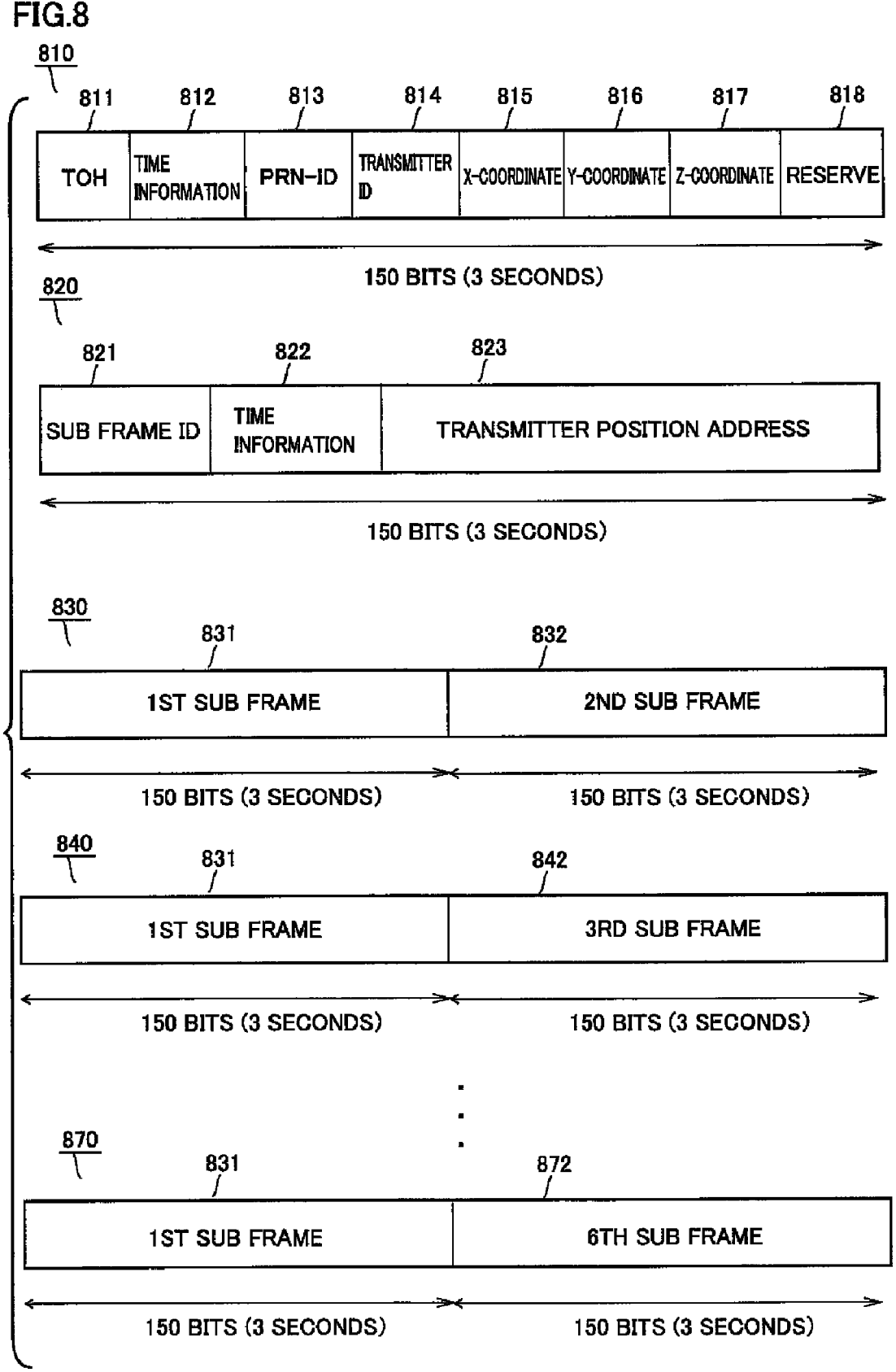
FIG. 8 is a (first) diagram representing a signal structure in accordance with another aspect of the first embodiment of the present invention.

In the following, a first modification of the present embodiment will be described with reference to FIG. 8. The structure of signals transmitted from various transmitters is not limited to that shown in FIG. 5. FIG. 8 shows a signal structure in accordance with the present modification. In the present modification, six sub frames are transmitted. As the first sub frame, a signal 810 is transmitted by the transmitter. Signal 810 includes a transport overhead 811 of 30 bits, time information 812 of 30 bits, a PRN-ID 813 of 6 bits, a transmitter ID 814 of 15 bits, X-coordinate value 815, Y-coordinate value 816 and Z-coordinate value 817. The first 60 bits of signal 810 are the same as the first 60 bits of each of the sub frames 510 to 550 emitted by a GPS satellite.

As the second sub frame, a signal 820 is transmitted by a transmitter. Signal 820 includes a sub frame ID 821 of 6 bits, an altitude correction coefficient 822, and a transmitter position address 823. By defining different pieces of information in 144 bits (in signal 820, altitude correction coefficient 822 and positional information address 823) following the sub frame ID of signal 820, the third to sixth sub frames are also transmitted in the similar manner. The pieces of information included in each sub frame are not limited to those described above. By way of example, advertisement related to positional information, URL (Uniform Resource Locators) of the Internet site and the like may be stored in areas defined beforehand in each sub frame.

Signal 830 represents an example of transmission of signals 810 and 820 described above and the third to sixth sub frames having the same structure as that of the signal 820. Specifically, signal 830 has a first sub frame 831 and a second sub frame 832. The first sub frame 831 has the same header as that of sub frames 510 to 550 transmitted from a GPS satellite. The second sub frame 832 corresponds to the signal 820.

Signal 840 includes a first sub frame 831 and a third sub frame 842. The first sub frame 831 is the same as the first sub frame 831. The third sub frame has the same structure as that of the signal 820.

The structure is repeated to the signal 870 for transmitting the sixth sub frame 872. Signal 870 includes the first sub frame 831 and the sixth sub frame 872.

When the transmitter repeatedly transmits the signals 830 to 870, it follows that the first sub frame 831 is transmitted every time each signal is transmitted. After the first sub frame 831 is transmitted, any of the other sub frames is interpolated. Specifically, the order of transmission of respective frames is first sub frame 831→second sub frame 832→first sub frame 831→third sub frame 842→first sub frame ... sixth sub frame 872<first sub frame 831→second sub frame 832 . . . .

<Second Modification>

Figure 9:
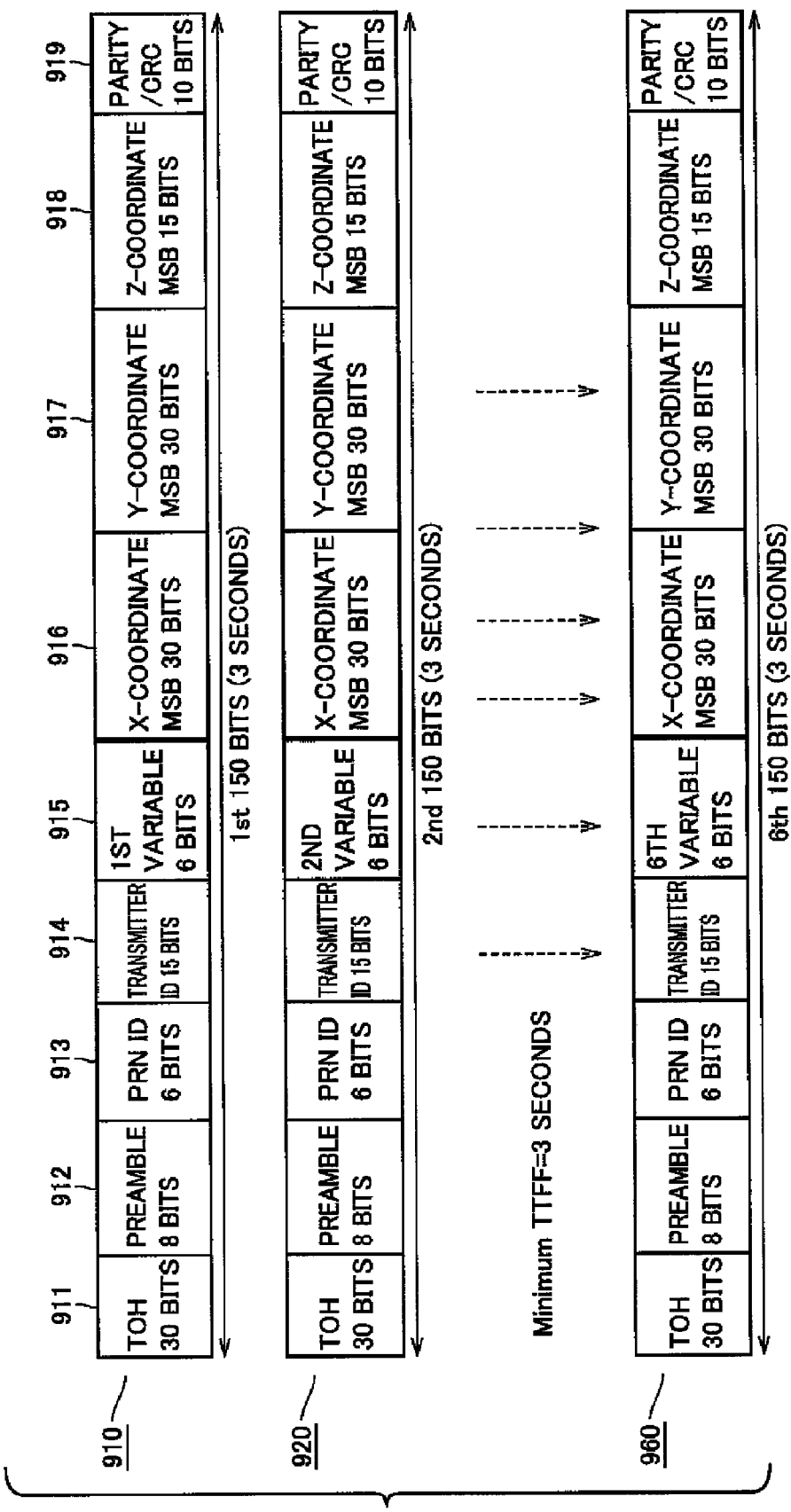
FIG. 9 is a (second) diagram representing a signal structure in accordance with another aspect of the first embodiment of the present invention.
Figure 10:
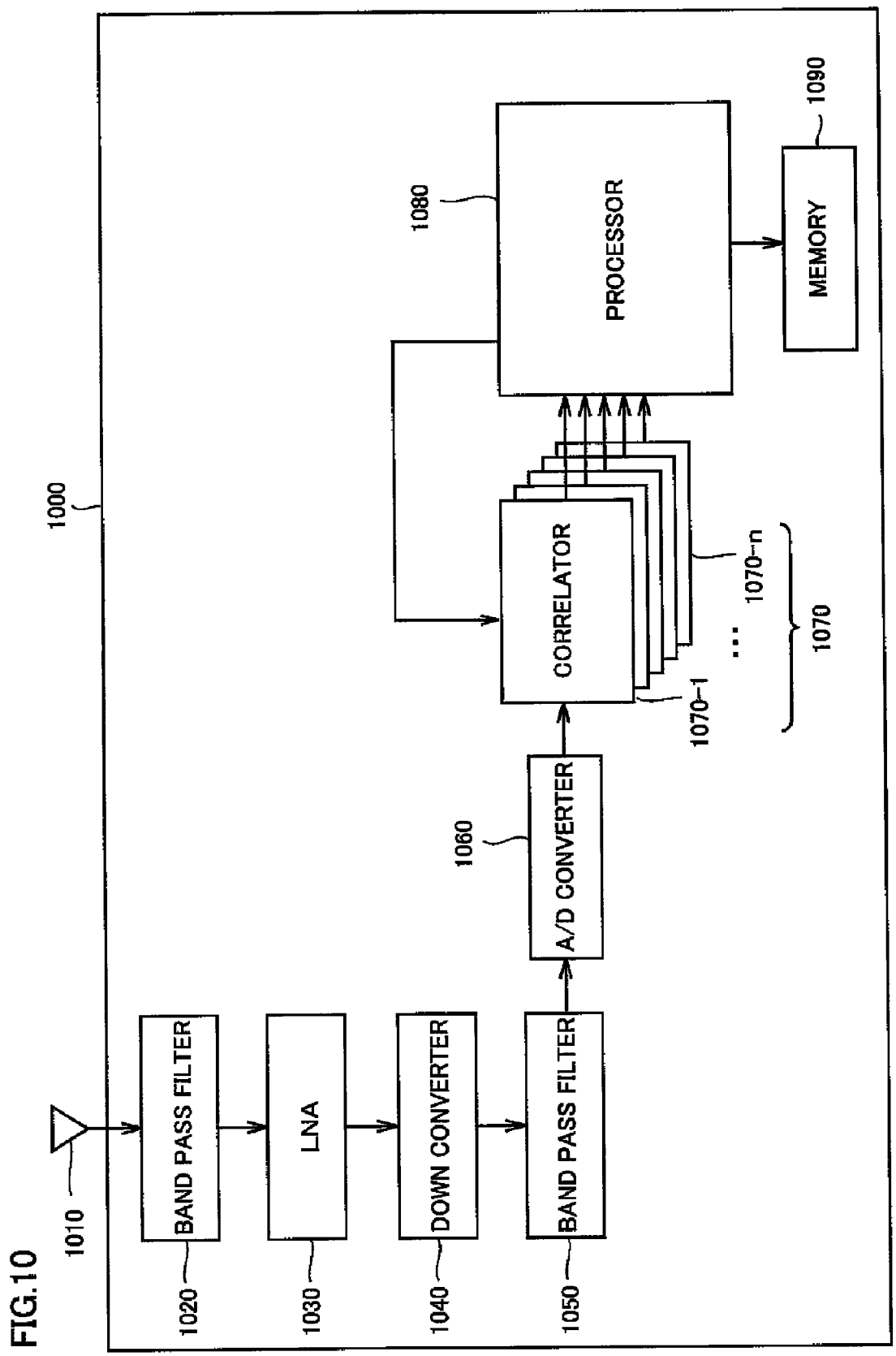
FIG. 10 is a block diagram showing a configuration of a positional information providing apparatus 1000 in accordance with a modification of the first embodiment of the present invention.

In the following, the second modification will be described. The structure of message data may be defined independent from sub frames 510 to 550. FIG. 9 schematically shows the structure of signal 910 in accordance with the present modification. Referring to FIG. 9, signal 910 includes a transport overhead 911, a preamble 912, a PRN-ID 913, a transmitter ID 914, a first variable 915, X-coordinate value 916, Y-coordinate value 917, Z-coordinate value 918, and a parity/CRC 919. A signal 920 has a structure similar to that of signal 910, and in place of the first variable 915 in signal 910, it includes a second variable 925.

Each signal has the length of 150 bits. Six signals having the same structure are emitted. The signal having such a structure may be formed as a signal emitted from an indoor transmitter.

Each signal shown in FIG. 9 has the PRN-ID and, therefore, it is possible for positional information providing apparatus 100 to specify the transmission source of the received signal, based on the PRN-ID. If the transmission source is an indoor transmitter, the signal contains X-, Y- and Z-coordinate values. Therefore, positional information providing apparatus 100 can display the indoor position.

<Third Modification>

In place of the structure of correlator unit 412 of positional information providing apparatus 100, a plurality of correlators may be used. In that case, processes for matching the positioning signal with the replica are executed simultaneously in parallel, and therefore the time for calculating positional information becomes shorter.

Positional information providing apparatus 1000 in accordance with the present modification includes an antenna 1010, a band pass filter 1020 electrically connected to antenna 1010, a low noise amplifier 1030 electrically connected to band pass filter 1020, a down converter 1040 electrically connected to low noise amplifier 1030, a band pass filter 1050 electrically connected to down converter 1040, an A/D converter 1060 electrically connected to band pass filter 1050, a parallel correlator 1070 including a plurality of correlators electrically connected to A/D converter 1060, a processor 1080 electrically connected to parallel correlator 1070, and a memory 1090 electrically connected to processor 1080.

Parallel correlator 1070 includes n correlators 1070-1 to 1070-n. The correlators simultaneously execute matching between the received positioning signal and the code pattern generated from demodulating the positioning signal, based on a control signal output from processor 1080.

Specifically, processor 1080 issues a command to each parallel correlator 1070 to generate a code pattern (with shifted code phase) reflecting a delay possibly experienced on the pseudo noise code. The command will be the number of satellites×2×1023 (length of code pattern of the used pseudo noise code). Each parallel correlator 1070 generates, based on the command applied to it, a code pattern having a different code phase, using the code pattern of pseudo noise code defined for each satellite. Then, it follows that among all the generated code patterns, there is one pattern that matches the code pattern of the pseudo noise code used for modulating the received positioning signal. Therefore, by preparing beforehand correlators of the necessary number for matching process using respective code patterns in the form of a parallel correlator 1070, a code pattern of the pseudo noise code can instantaneously be specified. This process is similarly applicable when positional information providing apparatus 100 receives a signal from an indoor transmitter. Therefore, even when the user of positional information providing apparatus stays indoors, the positional information can instantaneously be obtained.

Second Embodiment

In the following, a second embodiment of the present invention will be described. The positional information providing system in accordance with the present embodiment is different from the first embodiment in that a plurality of transmitters are attached.

Figure 11:
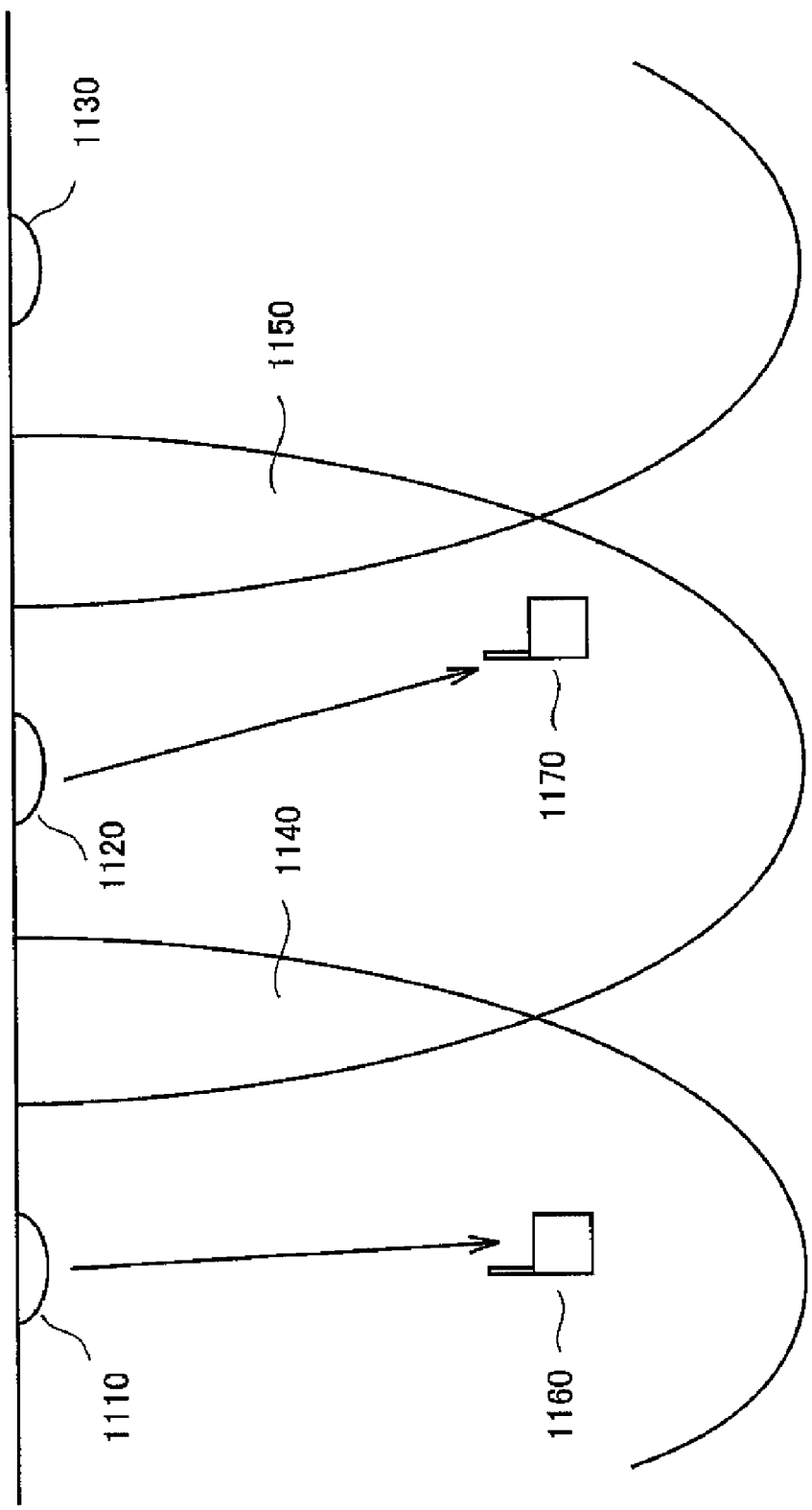
FIG. 11 shows a situation in which the positional information providing apparatus in accordance with the modification of the first embodiment of the present invention is used.

FIG. 11 shows a manner how the positional information providing apparatus in accordance with the second embodiment of the present invention is used. Referring to FIG. 11, indoor transmitters 1110, 1120 and 1130 are attached to the ceiling of one same floor. Each indoor transmitter executes the same process as executed by indoor transmitter 200-1 described above. Specifically, each indoor transmitter emits a positioning signal including data representing the location where it is installed.

Here, dependent on the position of attachment of indoor transmitters, there may be an area (or space) where signals transmitted from adjacent transmitters can both be received. By way of example, in an area 1140, signals emitted from indoor transmitters 1110 and 1120 can both be received. Similarly, in an area 1150, positioning signals emitted from indoor transmitters 1120 and 1130 can both be received.

Therefore, assuming that positional information providing apparatus 1160 in accordance with the present invention is at a position shown in FIG. 11, the positional information providing apparatus 1160 can obtain data representing the position of attachment of indoor transmitter 1110 included in the signal emitted from indoor transmitter 1110 as the position of positional information providing apparatus 1160. Thereafter, when the user of positional information providing apparatus 1160 moves to a position corresponding to area 1140, for example, the positional information providing apparatus 1160 can also receive the signal emitted by indoor transmitter 1120, in addition to the signal from indoor transmitter 1110. In that case, positional data included in which signal is to be used as the position of positional information providing apparatus 1160 may be determined based on the intensity of received signals. Specifically, if signals emitted from a plurality of indoor transmitters are received, the data of which signal intensity is the highest among these may be used for displaying the positional information. If the signals have the same intensity, arithmetic sum of data included in the signals may be derived and used as the position of positional information providing apparatus 1160.

As described above, by the positional information providing apparatus 1160 in accordance with the present embodiment, even when a plurality of signals for positioning are received indoors, an emission source of any of the signals can be specified, and therefore, the position of emission source, that is, the position of the transmitter installed indoors, can be specified.

Here, "indoors" is not limited to the inside of a building or other construction, and it means any place where the radio wave emitted from a GPS satellite cannot be received. Such places may include a ground mall or a railroad vehicle.

Third Embodiment

In the following, a third embodiment of the present invention will be described. The positional information providing apparatus in accordance with the present embodiment is different from the embodiments described above in that rather than specifying the position based on the data included in the indoor transmitter, data for identifying the transmitter is transmitted to an apparatus providing information related to the transmitter, so that positional information can be obtained.

Figure 12:
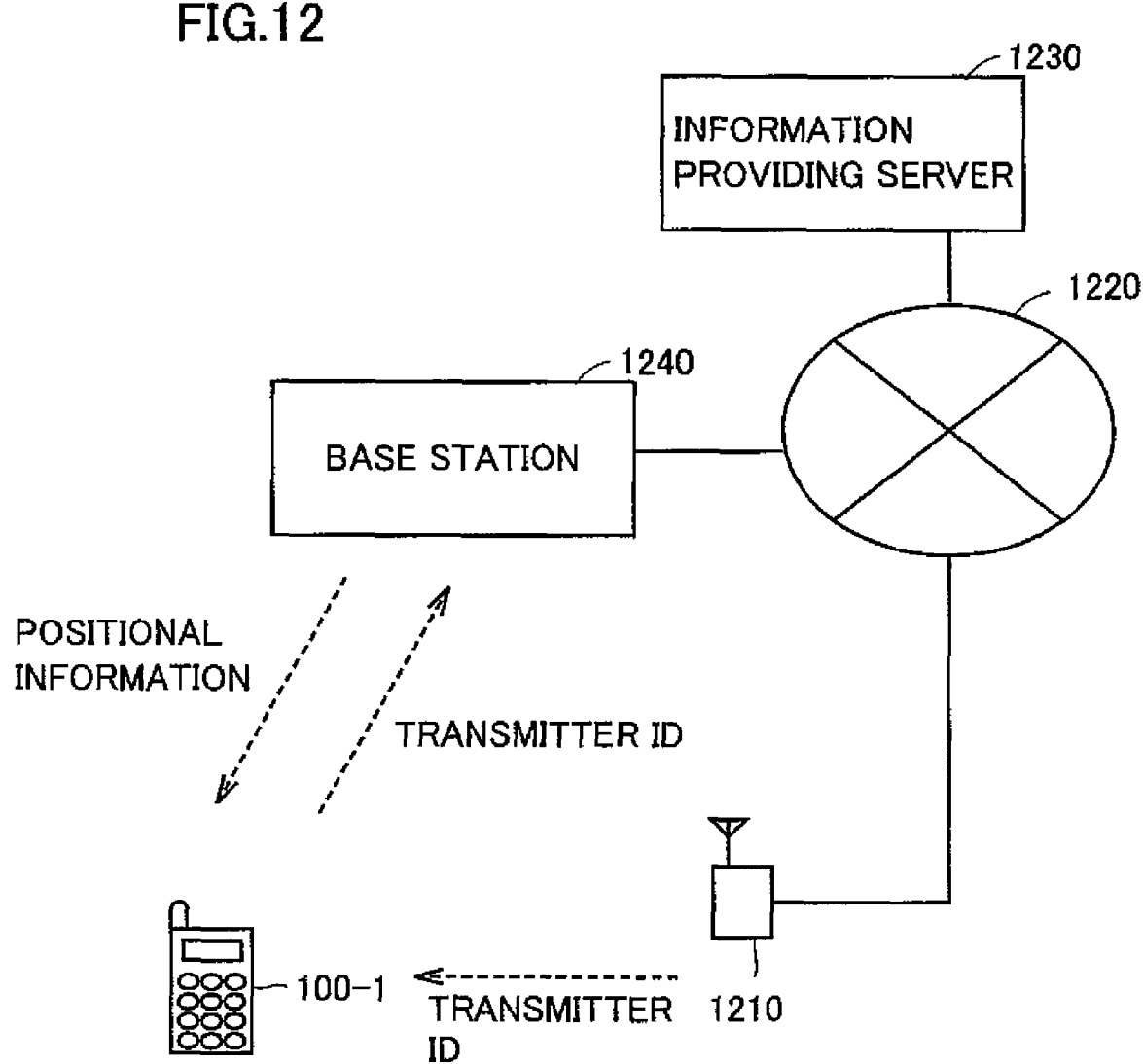
FIG. 12 shows a manner of use of the positional information providing apparatus in accordance with a second embodiment of the present invention.

FIG. 12 shows a manner how the positional information providing apparatus in accordance with the present embodiment is used. The positional information providing apparatus is implemented, for example, as a portable telephone 1200. Portable telephone 1200 can receive a positioning signal emitted by an indoor transmitter 1210. Indoor transmitter 1210 is connected to the Internet 1220. Internet 1220 is connected to an information providing server 1230 that can provide information related to indoor transmitter 1210. Internet 1220 is also connected to a base station 1240 for communication with portable telephone 1200.

When portable telephone 1200 receives a signal emitted by indoor transmitter 1210, it obtains a transmitter ID for identifying indoor transmitter 1210 from the signal. The transmitter ID, for example, corresponds to the PRN-ID described above. Portable telephone 1200 transmits the transmitter ID (optionally with the PRN-ID) to information providing server 1230. Specifically, portable telephone 1200 starts communication with base station 1240, and transmits a packet data including the obtained transmitter ID to information providing server 1230.

Recognizing the transmitter ID, information providing server 1230 makes a reference to a database related to the transmitter ID, and reads positional data related to the ID. When information providing server 1230 transmits the data to base station 1240, base station 1240 emits that data. Portable telephone 1200 detects arrival of the data, and in accordance with a browsing operation by the user of portable telephone 1200, obtains the position of transmitter 1210.

Figure 13:
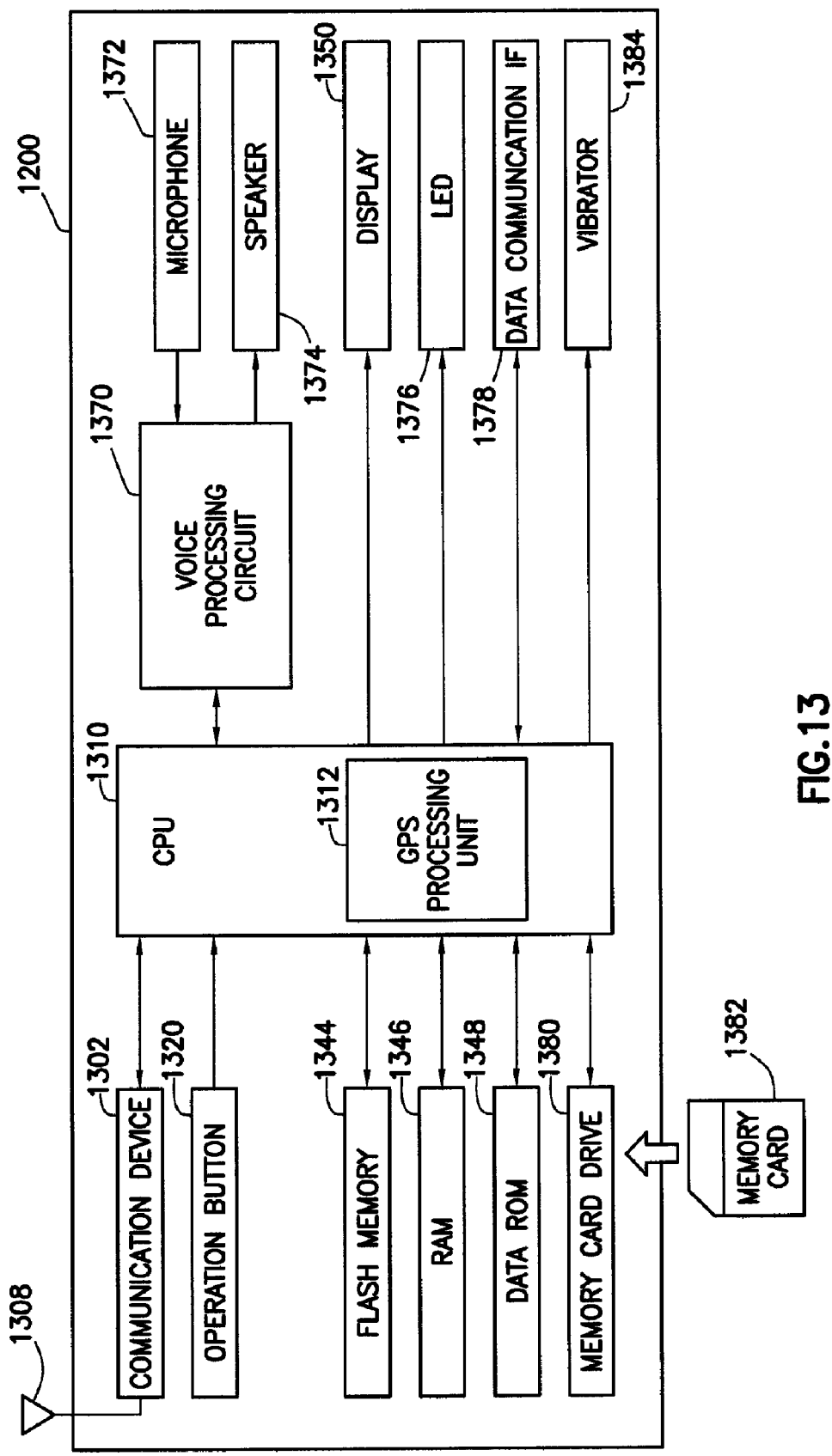
FIG. 13 is a block diagram representing a hardware configuration of a portable telephone 1200 in accordance with a third embodiment of the present invention.

Here, referring to FIG. 13, the structure of portable telephone 1200 will be described. FIG. 13 is a block diagram showing a hardware configuration of portable telephone 1200. Portable telephone 1200 includes an antenna 1308, a communication device 1302, a CPU 1310, an operation button 1320, a camera 1340, a flash memory 1344, an RAM 1346, a data ROM 1348, a memory card drive 1380, a voice signal processing circuit 1370, a microphone 1372, a speaker 1374, a display 1350, an LED (Light Emitting Diode) 1376, a data communication IF 1378, and a vibrator 1384, all electrically connected to each other.

A signal received by antenna 1308 is transferred to CPU 1310 by communication device 1302. CPU 1310 transfers the signal to voice signal processing circuit 1370. Voice signal processing circuit 1370 executes a predefined signal processing on the signal, and transmits the processed signal to speaker 1374. Based on the signal, speaker 1374 outputs voice.

Microphone 1372 receives a speech to portable telephone 1200, and outputs a signal corresponding to the spoken voice to voice signal processing circuit 1370. Based on the signal, voice signal processing circuit 1370 executes a predefined signal processing for communication, and transmits the processed signal to CPU 1310. CPU 1310 converts the signal to data for transmission, and transmits the data to communication device 1302. When communication device 1302 emits the signal through antenna 1308, base station 1240 receives the signal.

Flash memory 1344 stores data sent from CPU 1310. CPU 1310 reads data stored in flash memory 1344, and executes predefined processes using the data.

RAM 1346 temporarily stores data generated by CPU 1310, based on an operation on operation button 1320. Data ROM 1348 stores data or program for causing portable telephone 1200 to execute a predetermined operation. CPU 1310 reads the data or program from data ROM 1348, and causes portable telephone 1200 to execute the predetermined process.

Memory card drive 1380 receives a memory card 1382 loaded thereto. Memory card drive 1380 reads data stored in memory card 1382, and transmits the data to CPU 1310. Memory card drive 1380 writes the data output from CPU 1310 to a data storage area ensured in memory card 1382.

Voice signal processing circuit 1370 executes a process on a signal used for communication such as described above. CPU 1310 and voice signal processing circuit 1370 may be formed integrally.

Based on the data output from CPU 1310, display 1350 displays an image defined by the data. For example, if flash memory 1344 stores data (for example, URL) for accessing to information providing server 1230, display 1350 displays the URL.

LED 1376 realizes a predetermined light emitting operation based on a signal from CPU 1310. By way of example, if LED 1376 is capable of displaying a plurality of colors, based on the data included in the signal output from CPU 1310, LED 1376 emits light in a color related to the data.

A cable for data communication is attached to data communication IF 1378. Data communication IF 1378 transmits a signal output from CPU 1310 to the cable. Alternatively, data communication IF 1378 transmits data received from the cable to CPU 1310.

Vibrator 1384 oscillates at a predetermined frequency based on the signal output from CPU 1310. Basic operation of portable telephone 1200 can be readily understood by a person skilled in the art, and therefore, detailed description thereof will not be repeated here.

Figure 14:
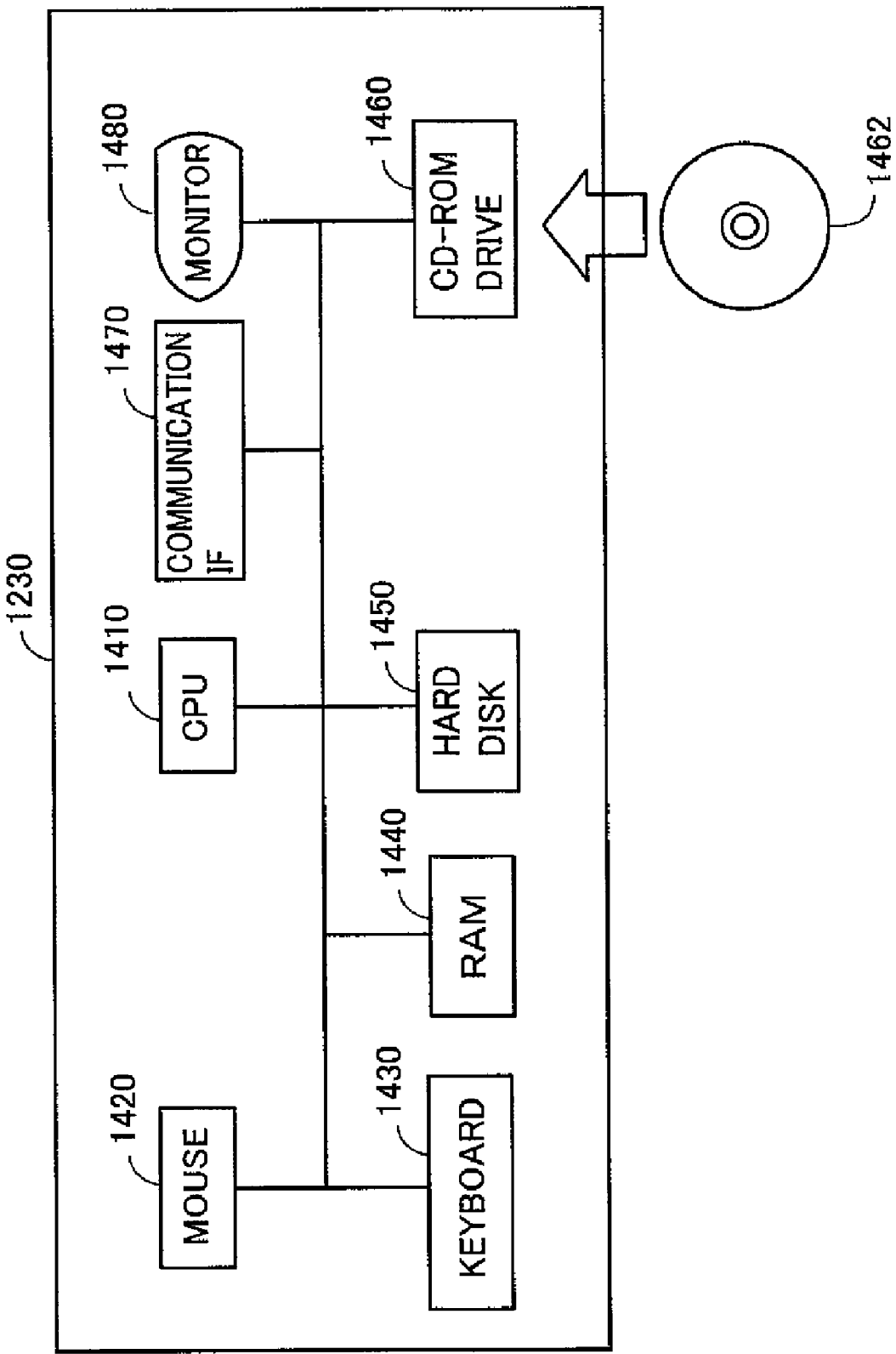
FIG. 14 is a block diagram representing a hardware configuration of an information providing server 1230 in accordance with a third embodiment of the present invention.

Referring to FIG. 14, a specific configuration of information providing server 1230 will be described. FIG. 14 is a block diagram representing a hardware configuration of information providing server 1230. Information providing server 1230 is implemented, for example, by a well-known computer system.

Information providing server 1230 includes, as main hardware, a CPU 1410, a mouse 1420 and a keyboard 1430 for receiving inputs of instructions from a user of information providing server 1230, an RAM 1440 temporarily storing data generated by an execution of a program by CPU 1410 or data input through mouse 1420 or keyboard 1430, a hard disk 1450 storing a large amount of data in non-volatile manner, a CD-ROM (Compact Disk-Read Only Memory) drive 1460, a monitor 1480, and a communication IF 1470. These hardware components are connected to each other by a data bus. A CD-ROM 1462 is loaded to CD-ROM drive 1460.

The process in the computer system implementing the information providing server 1230 is realized by the hardware and software executed by CPU 1410. The software may be stored in advance in hard disk 1450. Alternatively, the software may be stored in a data recording medium such as CD-ROM 1460 or the like, and distributed as a program product. Alternatively, the software may be provided as a downloadable program product by other information provider connected to the Internet. The software is read by CD-ROM drive 1460 or other data reading device from the data recording medium, or downloaded through communication IF 1470, and temporarily stored in hard disk 1450. The software is read from hard disk 1450 by CPU 1410, and stored in the form of an executable program in RAM 1440. CPU 1410 executes the program.

The hardware of computer system implementing the information providing server 1230 shown in FIG. 14 is a common one. Therefore, essential portions of information providing server 1230 in accordance with the present invention may be the software stored in RAM 1440, hard disk 1450, CD-ROM 1462 or other data recording medium, or the software downloadable through the network. The hardware operation of the computer system is well known. Therefore, detailed description thereof will not be repeated.

The recording medium is not limited to CD-ROM 1462, hard disk 1450 and the like described above, and it may be a medium that can carry the program in a fixed manner, such as a magnetic tape, cassette tape, optical disk (MO (Magnetic Optical Disk) (Mini Disc)/DVD (Digital Versatile Disc)), an IC (Integrated Circuit) card (including a memory card), an optical card, or a semiconductor memory including a mask ROM, EPROM, EEPROM, and a flash ROM.

The program here includes not only the program directly executable by CPU 1410 but also a program in the form of a source code, a compressed program or encrypted program.

Referring to FIG. 15, the data structure of information providing server 1230 will be described. FIG. 15 schematically shows a manner how the data is stored in hard disk 1450. Hard disk 1450 includes areas 1510 to 1550 for storing data.

Record No. for identifying data record stored in hard disk 1450 is stored in an area 1510. A transmitter ID for identifying a transmitter emitting the positioning signal is stored in area 1520. Data (coordinate values) representing the location where the transmitter is installed is stored in area 1530. By way of example, the data is stored every time a transmitter is installed, in hard disk 1450. A specific name of the installation site of the transmitter is stored in an area 1540. The data is used to enable recognition by an administrator managing the data stored in hard disk 1450 (or service provider providing positional information using information providing server 1230). Data representing an address where the transmitter is installed is stored in area 1550. The data is also used by the administrator, similar to the data stored in area 1540.

The positional information of the transmitter is provided by information providing server 1230 in the following manner. Portable telephone 1200 generates a packet data requesting positional information (hereinafter referred to as a "request"), using transmitter ID and data (URL and the like) for accessing to information providing server 1230 obtained based on the result of determination of PRN-ID. Portable telephone 1200 transmits the request to base station 1240. The transmission is realized by known communication processing. Receiving the request, base station 1240 transfers it to information providing server 1240.

Information providing server 1230 detects reception of the request. CPU 1410 obtains the transmitter ID from the request, and searches in hard disk 1450. Specifically, CPU 1410 performs a matching process to see whether the obtained transmitter ID matches a transmitter ID stored in area 1520. As a result of matching, if there is found a transmitter ID that matches the transmitter ID included in the data transmitted from portable telephone 1200, CPU 1410 reads coordinate values (area 1530) related to the transmitter ID, and generates a packet data for returning the positional information to portable telephone 1200. Specifically, CPU 1410 adds an address of portable telephone 1200 to the data having the coordinate values, to generate packet data. CPU 1410 transmits the packet data to base station 1240, through communication IF 1470.

Receiving the packet data transmitted by information providing server 1230, base station 1240 emits the packet data based on the address included in the data. Base station 1240 may store the received packet data and the time of reception in a non-volatile storage (such as a hard disk). This leaves history of obtaining positional information by the user of portable telephone 1200, and therefore, the path of movement of the user can be tracked.

When portable telephone 1200 is within reach of radio wave from base station 1240, it receives the packet data emitted by base station 1240. When the user of portable telephone 1200 executes a predefined operation (such as an operation for browsing an electronic mail) for browsing the received data, display 1350 displays the coordinate values of the transmitter. Thus, it is possible for the user to know the approximate position. By this approach, it becomes unnecessary for registering beforehand coordinate values of each of the transmitters installed indoors. Thus, the installation site of the transmitter can more flexibly be changed.

As described above, according to the positional information providing system in accordance with the present embodiment, the signal emitted from a transmitter provided on the ground has to include only the data (transmitter ID) for identifying the transmitter. In a server providing the positional information of the transmitter, the data is stored in relation to the positional information. Portable telephone 1200 functioning as a positional information providing apparatus obtains the positional information by transmitting the transmitter ID to the server. According to such a method of providing information, it is unnecessary to have the transmitter hold the positional information of the transmitter itself, and therefore, the position of installation of the transmitter can easily be changed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The positional information providing apparatus in accordance with the present invention is applicable to a portable telephone having the positioning function, a portable positioning terminal, a portable monitoring terminal or other terminal capable of receiving a positional signal. Further, the transmitter in accordance with the present invention is applicable to a transmitter installed indoors or other transmitting apparatuses.

The invention claimed is:

1. A positional information providing system capable of providing positional information using first positioning signals as spread spectrum signals from a plurality of satellites, comprising:
   an indoor transmitter, said indoor transmitter including
      a first storage unit storing positional data for specifying a location where said indoor transmitter is installed,
      a generating unit generating a second positioning signal having said positional data as a spread spectrum signal, and
      a transmitting unit transmitting said spread spectrum signal; and
   a positional information providing apparatus, said positional information providing apparatus including
      a receiving unit receiving the spread spectrum signal,
      a second storage unit storing code patterns related to said first and second positioning signals,
      a specifying unit specifying, based on the code pattern stored in said second storage, a code pattern corresponding to the spread spectrum signal received by said receiving unit,
      a determining unit determining which of said first and second positioning signals has been received, based on a signal obtained by demodulation using the code pattern specified by said specifying unit,
      a positional information calculating unit calculating positional information of said positional information providing apparatus by switching a process dependent on the result of said determination, and
      an output unit outputting the positional information derived by said positional information calculating unit; wherein
   said positional information calculating unit obtains said positional data from said signal obtained by demodulation, when said second positioning signal transmitted by said indoor transmitter is received, and
   calculates said positional information based on each of said plurality of spread spectrum signals when a plurality of said first positioning signals are received.

2. The positional information providing system according to claim 1, wherein said positional information calculating unit obtains said positional data from said signal obtained by demodulation when said second positional signal transmitted by a single said indoor transmitter is received.

3. The positional information providing system according to claim 1, wherein time kept by a first clock device of each of said satellites for generating time information included in said first positioning signal from said satellite is independent from time kept by a second clock device in said indoor transmitter.

4. The positional information providing system according to claim 1, wherein
   said second positioning signal has a format common to that of said first positioning signal and includes said positional data in place of a navigation message included in said first positioning signal; and
   said positional information calculating unit of said positional information providing apparatus includes a calculating unit calculating a position of said positional information providing apparatus based on each said navigation message when a plurality of said first positioning signals are received.

5. The positional information providing system according to claim 1, wherein
   said positional data is data directly indicating position of said indoor transmitter solely by said positional data; and
   said output unit outputs said positional information derived solely from said positional data as an image representing a measured position.

6. The positional information providing apparatus according to claim 1, wherein said positional data includes either coordinate values on the ground of said indoor transmitter or data representing a location where said indoor transmitter is installed.

7. The positional information providing system according to claim 1, wherein
   said specifying unit includes a plurality of correlators, said plurality of correlators provided common to said first and second positioning signals and executing correlating process between said plurality of code patterns and said spread spectrum signals in parallel to each other for specifying said code pattern; and said positional information calculating unit switches said process in accordance with the result of determination based on outputs from said plurality of correlators.

8. The positional information providing system according to claim 1, wherein
said coded positional signal has central frequency of 1575.42 MHz; and
the spreading frequency of said positioning signal is 1.023 MHz.

9. A positional information providing apparatus for providing positional information, using first positioning signals as spread spectrum signals from a plurality of satellites and a second positioning signal emitted by an indoor transmitter installed at a location specified in advance and including positional data for specifying said location, comprising:
a receiving unit receiving a spread spectrum signal;
a storage unit storing code patterns related to said first and second positioning signals;
a specifying unit for specifying a code pattern corresponding to the spread spectrum signal received by said receiving unit based on a code pattern stored in said storage;
a determining unit determining which of said first and second positioning signals has been received based on a signal obtained by demodulation using the code pattern specified by said specifying unit;
a positional information calculating unit calculating positional information of said positional information providing apparatus by switching a process dependent on the result of said determination; and
an output unit outputting the positional information derived by said positional information calculating unit; wherein
said positional information calculating unit obtains said positional data from said signal obtained by demodulation, when said second positioning signal transmitted by said indoor transmitter is received, and
calculates said positional information based on each of said plurality of spread spectrum signals when a plurality of said first positioning signals are received.

10. The positional information providing apparatus according to claim 9, wherein said positional information calculating unit obtains said positional data from said signal obtained by demodulation when said second positional signal transmitted by a single said indoor transmitter is received.

11. The positional information providing apparatus according to claim 9, wherein
said second positioning signal has a format common to that of said first positioning signal and includes said positional data in place of a navigation message included in said first positioning signal; and
said positional information calculating unit of said positional information providing apparatus further includes a calculating unit calculating a position of said positional information providing apparatus, based on each said navigation message, when a plurality of said first positioning signals are received.

12. The positional information providing apparatus according to claim 9, wherein
said positional data is data directly indicating a position of said indoor transmitter solely by said positional data; and
said output unit outputs said positional information derived solely from said positional data as an image representing a measured position.

13. The positional information providing apparatus according to claim 9, wherein
said positional data includes information representing a location where said indoor transmitter is installed; and
said output unit includes a display unit displaying the location where said indoor transmitter is installed based on said information.

14. The positional information providing apparatus according to claim 9, wherein
said specifying unit includes a plurality of correlators, said plurality of correlators being provided common to said first and second positioning signals and executing correlating process between said plurality of code patterns and said spread spectrum signals in parallel to each other for specifying said code pattern; and
said positional information calculating unit switches said process in accordance with the result of determination based on outputs from said plurality of correlators.

15. The positional information providing apparatus according to claim 9, wherein
said receiving unit receives each of said first positioning signals emitted from transmitters each installed at each of a plurality of locations specified in advance;
said positional information providing apparatus further comprising
a detecting unit detecting intensity of a signal received by said receiving unit; wherein
said obtaining unit specifies, among said first positioning signals, a first positioning signal of which said intensity is the highest, and obtains positional data included in the specified first positioning signal.

16. The positional information providing apparatus according to claim 9, wherein
said positional data includes an identification data for identifying said transmitter;
said positional information providing apparatus comprising:
a transmitting unit transmitting, when said first positioning signal is received, said identification data and a transmission request for positional information of said transmitter through a communication line, to a server that provides positional information in response to an external request, said positional information and said identification data being stored in relation to each other in said server; and
an input unit receiving an input of said positional information transmitted by said server in response to said transmission request through said communication line; wherein
said output unit includes a display unit for displaying said positional information.

17. The positional information providing apparatus according to claim 9, comprising any of a portable telephone, a portable information terminal, a portable positioning apparatus, and a positioning system installed in a vehicle.

18. An indoor transmitter transmitting a signal of the same format as a first positioning signal emitted by a satellite transmitting a signal for positioning, comprising:
a storage unit storing positional data for specifying a location where said indoor transmitter is installed; and
a generating unit generating a second positioning signal having said positional data as a spread spectrum signal, said generating unit generating said second positioning signal as a spread spectrum signal having said positional data in place of a navigation message included in said first positioning signal and allowing specification of said location by the signal from a single said indoor transmitter; and a transmitting unit transmitting said spread spectrum signal.

19. The indoor transmitter according to claim 18, wherein time kept by a first clock device of each of said satellites for generating time information included in said first positioning signal from said satellite is independent from time kept by a second clock device in said indoor transmitter.

20. The indoor transmitter according to claim 19, wherein said positional data includes either coordinate values on the ground of said indoor transmitter or data representing a location where said indoor transmitter is installed.

* * * * *